US012790828B2

(12) United States Patent
Bafna et al.

(10) Patent No.: US 12,790,828 B2
(45) Date of Patent: Nov. 10, 2026

(54) INTERLOCKING SYSTEMS AND METHODS FOR TILE PANEL MOUNTING

(71) Applicants: Mont Granite, Inc., Solon, OH (US); PANEL COMPOSITE SYSTEMS, INC., Solon, OH (US)

(72) Inventors: Dinesh Bafna, Pepper Pike, OH (US); Kenneth I. Mueller, University Heights, OH (US); Rhys Hamlet, Santa Barbara, CA (US)

(73) Assignee: PANEL COMPOSITE SYSTEMS, INC., Solon, OH (US)

( * ) Notice: Subject to any disclaimer, the term of this patent is extended or adjusted under 35 U.S.C. 154(b) by 790 days.

(21) Appl. No.: 18/169,569

(22) Filed: Feb. 15, 2023

(65) Prior Publication Data

US 2023/0265662 A1 Aug. 24, 2023

Related U.S. Application Data

(60) Provisional application No. 63/268,387, filed on Feb. 23, 2022.

(51) Int. Cl.

| | |
|---|---|
| ***E04F 13/08*** | (2006.01) |
| ***A47G 1/02*** | (2006.01) |
| ***A47G 1/16*** | (2006.01) |
| ***F21V 33/00*** | (2006.01) |
| *A47K 3/28* | (2006.01) |
| *F21V 23/04* | (2006.01) |

(52) U.S. Cl.

CPC ............ *E04F 13/0816* (2013.01); *A47G 1/02* (2013.01); *A47G 1/1606* (2013.01); *E04F 13/0875* (2013.01); *F21V 33/006* (2013.01); *A47K 3/283* (2013.01); *F21V 23/04* (2013.01)

(58) Field of Classification Search

CPC ........ A47G 1/02; A47G 1/1606; A47K 3/283; E04F 13/0816; E04F 13/0875; F21V 23/04; F21V 23/006

USPC ........................................................ 52/489.1

See application file for complete search history.

(56) References Cited

U.S. PATENT DOCUMENTS 8,033,066 B2 * 10/2011 Griffiths .............. E04F 13/0889 52/510
10,017,320 B2 * 7/2018 Wallis .................... A47K 3/284
11,371,245 B2 * 6/2022 McManus ......... E04F 15/02044
2003/0188379 A1 * 10/2003 Cowell .................... A47K 3/30 52/282.2

(Continued)

*Primary Examiner* — James J Buckle, Jr.

(74) *Attorney, Agent, or Firm* — Amin, Turocy & Watson, LLP

(57) ABSTRACT

Interlocking systems that mechanically secure tile panels to a supporting structure are enabled. For example, a panel mounting apparatus can comprise: a panel material comprising a first side and a second side, opposite the first side, a substrate material attached to the second side of the panel material, a fastening track attached to the second side of the panel material, adjacent to the substrate material, a mounting clip attached to the fastening track on a first side of the mounting clip, wherein the mounting clip comprises a projection from a second side of the mounting clip, opposite the first side, and a receiving body comprising locking channel that receives the projection, wherein an internal shape of the locking channel compliments an internal shape of the projection.

20 Claims, 31 Drawing Sheets

(56) References Cited

U.S. PATENT DOCUMENTS

| | | | | |
|---|---|---|---|---|
| 2009/0272055 | A1* | 11/2009 | Griffiths | E04F 13/0889 52/309.3 |
| 2010/0281612 | A1* | 11/2010 | Cook | A47K 3/008 52/302.6 |
| 2014/0331598 | A1* | 11/2014 | White | A47K 3/04 52/775 |
| 2015/0107018 | A1* | 4/2015 | Vagedes | A47K 3/02 4/584 |
| 2016/0206156 | A1* | 7/2016 | Smith | A47K 3/40 |

* cited by examiner

INTERLOCKING SYSTEMS AND METHODS FOR TILE PANEL MOUNTING

RELATED APPLICATION

This application claims the benefit of U.S. Provisional Patent Application No. 63/268,387, filed Feb. 23, 2022, and entitled "TILE PANEL MOUNTING," which is incorporated by reference herein in its entirety.

TECHNICAL FIELD

The subject disclosure relates to systems for mounting and/or hanging of panels, and more particularly, to interlocking systems that mechanically secure tile panels to a supporting structure.

BACKGROUND

Tiles of hard surface material (e.g., porcelain, stone, laminate, and/or the like) are often installed in residential and/or commercial buildings to achieve a functional, aesthetic interior design. For example, tiles can serve as walls, floors, countertops, and/or a ceiling. In particular, tiles are typically employed in environments that may be exposed to water and/or moisture, such as bathrooms and/or kitchens. Traditionally, tiles are installed by depositing mortar onto a continuous substrate (e.g., cement board), embedding the tile panel in the mortar, and depositing grout between adjacent tiles. However, this method of installation can be time consuming, labor intensive, demand multiple types of resources, and/or require expertise. The installation process can be particularly challenging for large format tile panels, which can extend to dimensions beyond the reach of a single individual and/or can be fragile in nature.

Figure 1A:
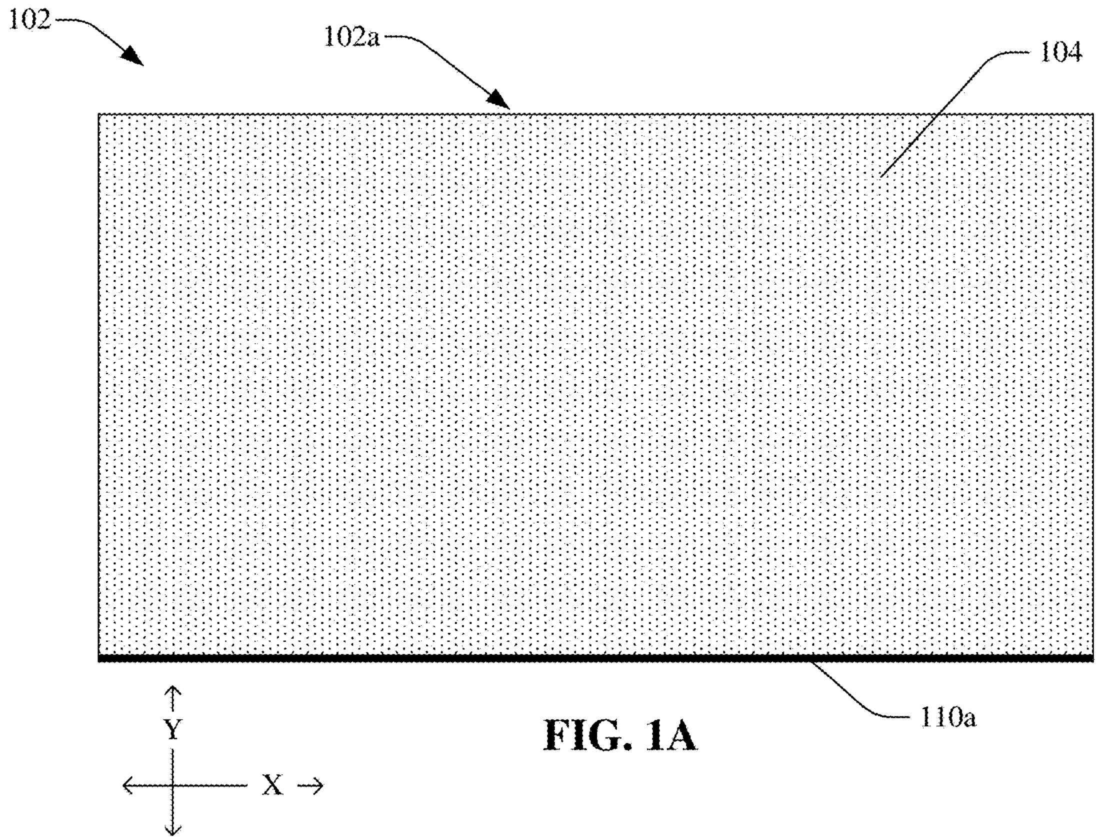
FIGS. 1A-1H illustrate diagrams of an example, non-limiting tile panel that can be mechanically mounted to a support structure in accordance with one or more embodiments described herein.

Appendix A is an instruction manual that forms part of this specification.

DETAILED DESCRIPTION

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. Additionally, the illustrated “X”, “Y”, and/or “Z” axes delineate the same respective orientations throughout the drawings.

Various embodiments described herein regard apparatuses, systems, and/or methods for mounting tile panels (e.g., large format tile panels) to a support structure (e.g., wall studs, top plate, and/or bottom plate). In accordance with various embodiments described herein, the back side of a tile panel can include one or more fastening tracks for mechanically securing the tile panel to a support structure without the use of traditional mortar techniques. For example, one or more clips can be attached to the fastening track. The clips can have an architecture designed to mate with one or more receiving bodies. Further, one or more embodiments described herein can regard a receiving body that can be mounted onto a support structure. For example, the receiving body can be mounted between the studs of a wall. The receiving body can comprise one or more cavities that complement projections of the clips. In various embodiments, the clip projections can be inserted into the cavities of the receiver body to establish a mechanical lock. In this regard, the tile panel (e.g., attached to the clips via the fastening track) can be secured to the receiving body and mechanically supported by the support structure (e.g., the stud walls). One or more embodiments described herein can further regard manufacturing and/or installation of the tile panels. Embodiments herein can be utilized in a variety of installations and are not limited to shower installations or bathroom type installations. For example, embodiments herein can be implemented in bathrooms, showers, wall cladding, fireplaces, siding, or in other suitable installations or environments. Materials herein can vary depending on the type and/or location of installation (e.g., fireproof materials for fireplace installations, waterproof or water-resistant materials for wet environments, etc.) It is noted that various components herein can be assembled using automated robotic equipment to facilitate efficient, repeatable assembly and production (e.g., robotic spreading of adhesives, robotic assembly of components, etc.) It is additionally noted that systems, components and/or subcomponents herein can be configured to efficiently fit on a shipping pallet and/or within a shipping box for efficient shipping and transportation.

Various tile panels described herein can be large format tile panels, which can provide functional and/or aesthetic value. It is noted that embodiments herein are not limited to tile materials. Rather, use of “tile” herein is intended to invoke a geometric interpretation, rather than a specific material interpretation. In this regard, embodiments herein can comprise a tile-like geometric shape, though embodiments herein are not limited to any particular shape and can comprise one or more of a variety of shapes (e.g., rectangle, circle, triangle, square, kite, trapezium, parallelogram, rhombus, or other suitable shapes). Further, the tile panels can be fastened to the support structure in a vertical or horizontal orientation (e.g., in the gravity direction) for commercial and/or residential construction projects. It is also noted that tile panels herein can be installed on vertical surfaces (e.g., walls), horizontal surfaces (e.g., ceilings or floors), curved surfaces, angled surfaces, or other suitable surfaces. Embodiments herein enable reusable or removable installations of tile panels herein as well as permanent installations of tile panels herein. Example materials that can comprise the tile panel can include, but are not limited to: natural stone (e.g., marble, granite, quartz, and/or the like), tile, laminate, porcelain, ceramics, glass, a veneer (e.g., a wood veneer), metals (e.g., stainless steel, aluminum, etc.), plastics, polymers, composites, alloys, melamine, a combination thereof, or any other suitable material. In various embodiments, a rigid substrate (e.g., waterproof polystyrene foam panel, styrofoam, extruded hard foam, a waterproofing material, concrete, laminate, porcelain, cement board, plywood, plastics, composites, polymers, metals, alloys, glass, melamine, or another suitable rigid substrate) can be attached to the backside of the tile panel between rows of the fastening tracks. It is additionally noted that instead of a rigid substrate, a flexible substrate material or semi-rigid material can be additionally or alternatively utilized (e.g., or a combination of rigid, flexible, and/or semi-rigid materials). For example, the tile panels can include a plurality of fastening tracks (e.g., three fastening tracks, though other suitable quantities can be utilized) extending along the length of the backside of the tile panel. The fastening tracks can be spaced apart from each other, with the rigid substrate positioned on the tile panel surface area between fastening tracks. In one or more embodiments, the fastening tracks and/or rigid substrate can be adhered to the backside of the tile via an adhesive (e.g., a marine grade adhesive sealant, an epoxy material, a polyester material, or another suitable adhesive).

An exposed surface of the fastening tracks can enable the clips to be attached to the fastening track via one or more fasteners (e.g., screws, bolts, nuts, and/or the like). In one or more embodiments, the clips can be attached to the fastening track in accordance with multiple possible orientations to facilitate vertical or horizontal installation of the tile panels. Further, multiple clips can be attached to each fastening track to achieve mechanical support across the surface area of the tile panel.

In one or more embodiments, mounting brackets can be attached to distal ends of a receiving body. The mounting brackets can be employed to secure the receiving body to the support structure. For example, mounting brackets (e.g., and thereby the receiving body) can be secured to wall studs via one or more fasteners (e.g., screws, nails, staples, and/or the like). Further, the mounting brackets can be positioned forward or backward on the stud wall so the receiving body can be plumb to the wall. The receiving body can comprise a reverse architecture relative to the clips, such that the clips can be inserted into, and lock with, the receiving body. Once the clips are attached to the fastening tracks and the receiving bodies are secured to the support structure (e.g., between wall studs), the tile panel can be lifted, aligned with the support structure, and pressed toward the receiving body such that the clips engage with one or more cavities of the receiving body and achieve a mechanical lock.

Figure 1B:
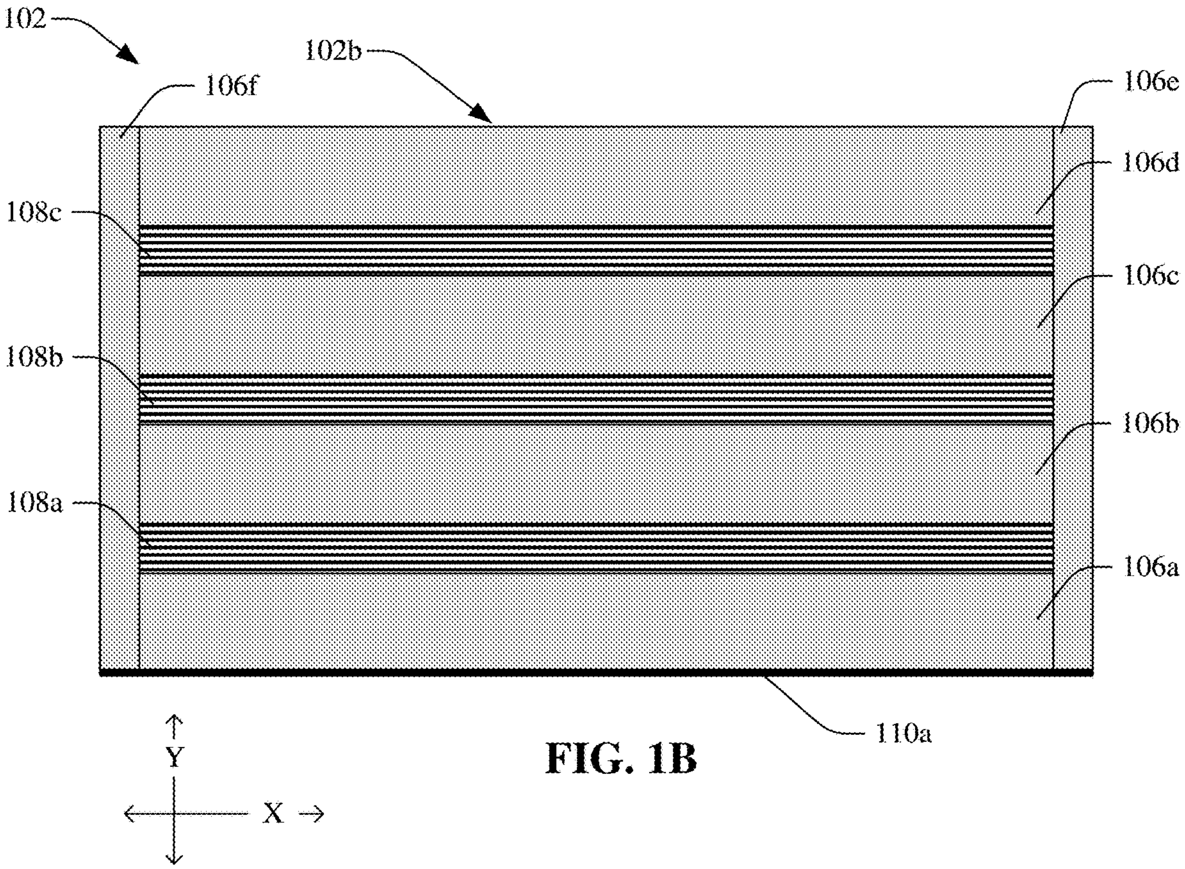
Figure 1C:
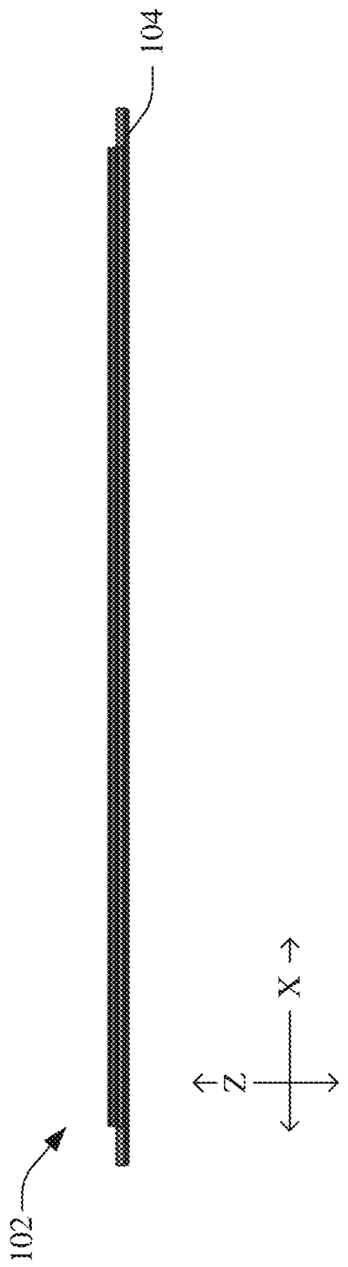

FIGS. 1A-1H illustrate diagrams of an example, non-limiting tile panel 102 in accordance with various embodiments described herein. FIG. 1A depicts a front side 102*a* (e.g., a first side) of the tile panel 102. FIG. 1B depicts a back side 102*b* (e.g., a second side) of the tile panel 102. FIG. 1C depicts a top or bottom view of the tile panel 102. The tile panel 102 can comprise a tile material 104, a rigid substrate 106, and/or one or more fastening tracks 108. The tile material 104 is visible on the front side 102*a* of the tile panel 102. Example materials that can comprise the tile material 104 include, but are not limited to: natural stone (e.g., marble, granite, quartz, and/or the like), tile, laminate, porcelain, ceramics, glass, a veneer (e.g., a wood veneer), metals (e.g., stainless steel, aluminum, alloys, etc.), plastics, polymers, composites, alloys, melamine, a combination thereof, or any other suitable material. The tile panels 102 can vary in dimensions. Although FIGS. 1A-1H depict the tile panel 102 with a rectangular shape, the geometry of the tile panels 102 is not so limited. For example, tile panels 102 comprising a circular geometry and/or a polygonal geometry are also envisaged.

As shown in FIG. 1B, the rigid substrate 106 and/or fastening tracks 108 can be secured to the back side 102*b* of the tile panels 102. In various embodiments, a plurality of fastening tracks 108 can be secured (e.g., adhered) to the back side 102*b* of the tile panel 102. For example, the back side 102*b* of the tile panel 102 can comprise one, two, three (e.g., as shown in FIG. 1B via first fastening track 108*a*, second fastening track 108*b*, and/or third fastening track 108*c*), or other fastening tracks 108. Further, the fastening tracks 108 can be spaced apart from each other in equal (e.g., as show in FIG. 1B) or unequal distances. Further, the fastening tracks 108 can extend along the entire length (e.g., along the X axis shown in FIG. 1B) of the tile panels 102 or along a portion of the length (e.g., as shown in FIG. 1B).

Also shown in FIG. 1B, the rigid substrate 106 can be positioned adjacent to the fastening tracks 108 (e.g., between the fastening tracks 108). In one or more embodiments, the rigid substrate 106 can comprise a waterproofing material, a composite material, and/or can comprise multiple layers. Example materials of the rigid substrate 106 (e.g., a rigid substrate panel) can comprise, but are not limited to, waterproof polystyrene foam panel, styrofoam, extruded hard foam, a waterproofing material, concrete, laminate, porcelain, cement board, plywood, plastics, composites, polymers, metals, alloys, glass, melamine, a combination thereof, or any other suitable material. It is additionally noted that instead of a rigid material, the rigid substrate 106 can additionally, or alternatively, comprise a flexible substrate material or a semi-rigid material (e.g., or a combination of rigid, flexible, and/or semi-rigid materials). In various embodiments, the rigid substrate 106 can be positioned on the surface of the back side 102*b* where the fastening tracks 108 are absent (e.g., as shown in FIG. 1B). Alternatively, the rigid substrate 106 can be positioned on portions of the back side 102*b* such that some of the tile material 104 remains exposed on the back side 102*b* of the tile panel 102. In some embodiments, a thickness of the rigid substrate 106 can be less than or equal to a thickness of the one or more fastening tracks 108, though in other embodiments, the rigid substrate 106 can be thicker than the thickness of the one or more fastening tracks 108. In this regard, in some embodiments, an exterior surface of the fastening track 108 can be substantially flush with an exterior surface of the rigid substrate 106. In various embodiments, the tile panels 102 can optionally comprise one or more seal members 110*a* (e.g., a waterproof membrane) along one or more edges and/or surfaces of the tile panel 102. The seal members 110*a* can comprise, for example, an elastic material that can facilitate forming a pressure seal between one or more surfaces and/or edges of the tile panel 102 and one or more external surfaces or edges of neighboring materials or components. It is noted that the seal members 110*a* can comprise one or more of a variety of materials, such as neoprene, rubber, silicone, nitrile, ethylene propylene diene terpolymer, fluoropolymer elastomer and/or synthetic rubber compounds, styrene butadiene, butadiene acrylonitrile, ethylene propylene, butyl, chlorosulfonated polyethylene, plastic, polymer, composite, or another suitable material and/or combination thereof that can be utilized to form a waterproof or water resistant seal.

Figure 1D:
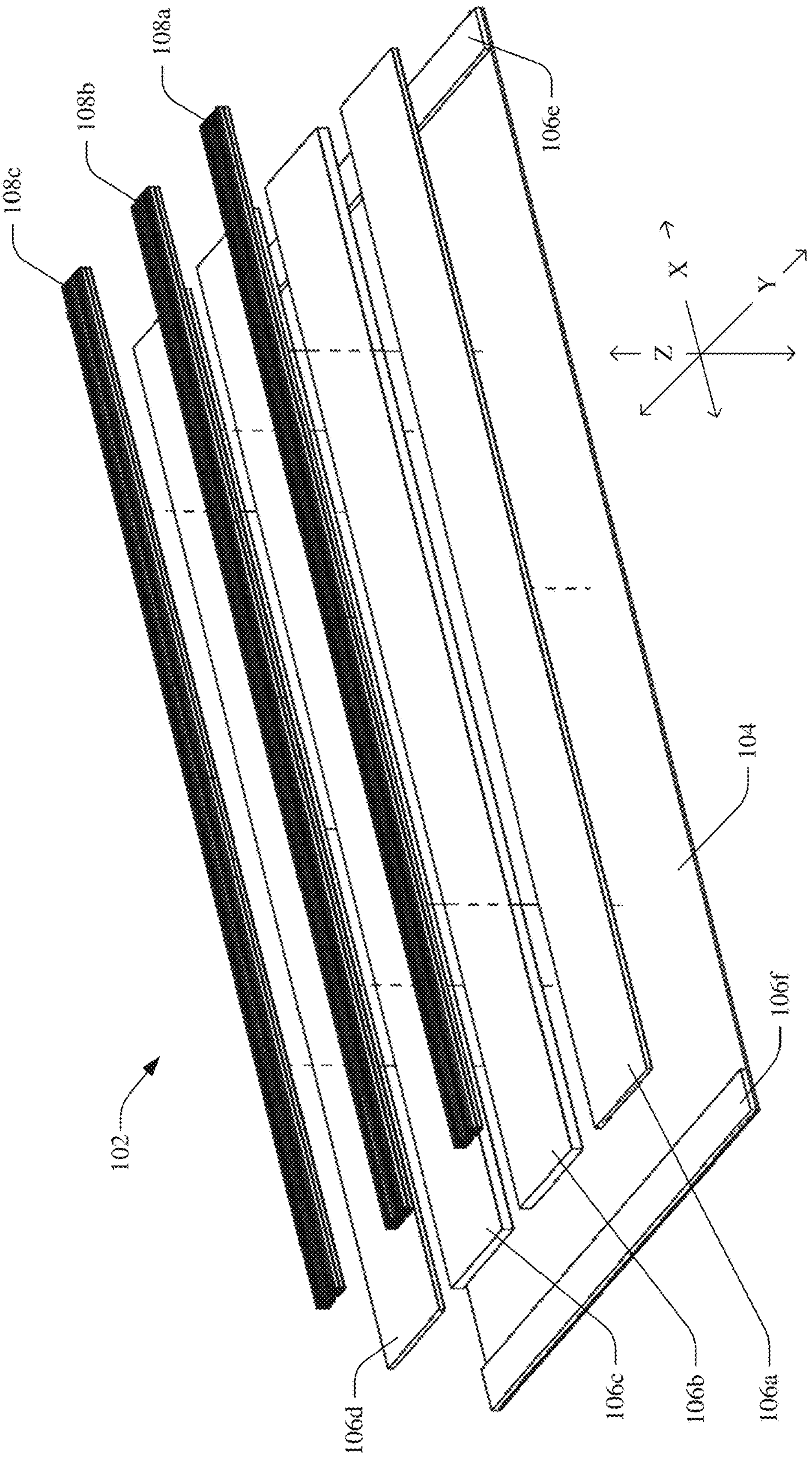

FIG. 1D illustrates an exploded view of the tile panel 102. As depicted in FIG. 1D, the rigid substrate 106 can comprise a plurality of panels (e.g., 106*a*, 106*b*, 106*c*, 106*d*, 106*e*, 106*f*, and so on). In one or more embodiments, various thicknesses of the rigid substrate 106 can be utilized, and/or one or more panels of the rigid substrate 106 can be stacked atop each other in order to adjust thickness.

Figure 1E:
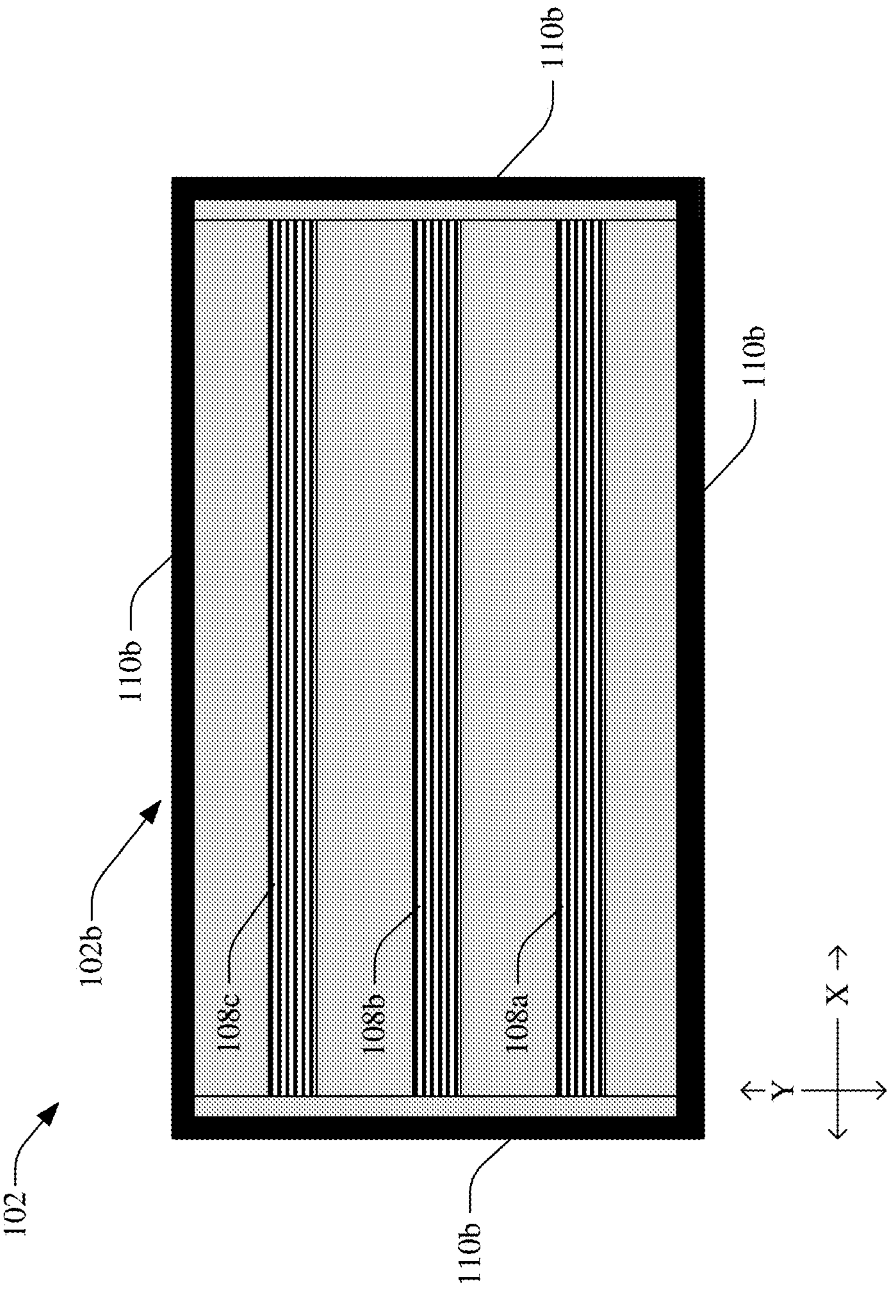

As shown in FIG. 1E, the tile panels 102 can optionally comprise one or more seal members 110*b* (a waterproof membrane) along one or more parameters of the tile panel 102. The seal members 110*b* can comprise, for example, an elastic material that can facilitate forming a pressure seal between one or more surfaces and/or edges of the tile panel 102 and one or more external surfaces or edges of neighboring materials or components. It is noted that the seal members 110*b* can comprise one or more of a variety of materials, such as neoprene, rubber, silicone, nitrile, ethylene propylene diene terpolymer, fluoropolymer elastomer and/or synthetic rubber compounds, styrene butadiene, butadiene acrylonitrile, ethylene propylene, butyl, chlorosulfonated polyethylene, plastic, polymer, composite, or another suitable material and/or combination thereof that can be utilized to form a waterproof or water resistant seal.

Figure 1F:
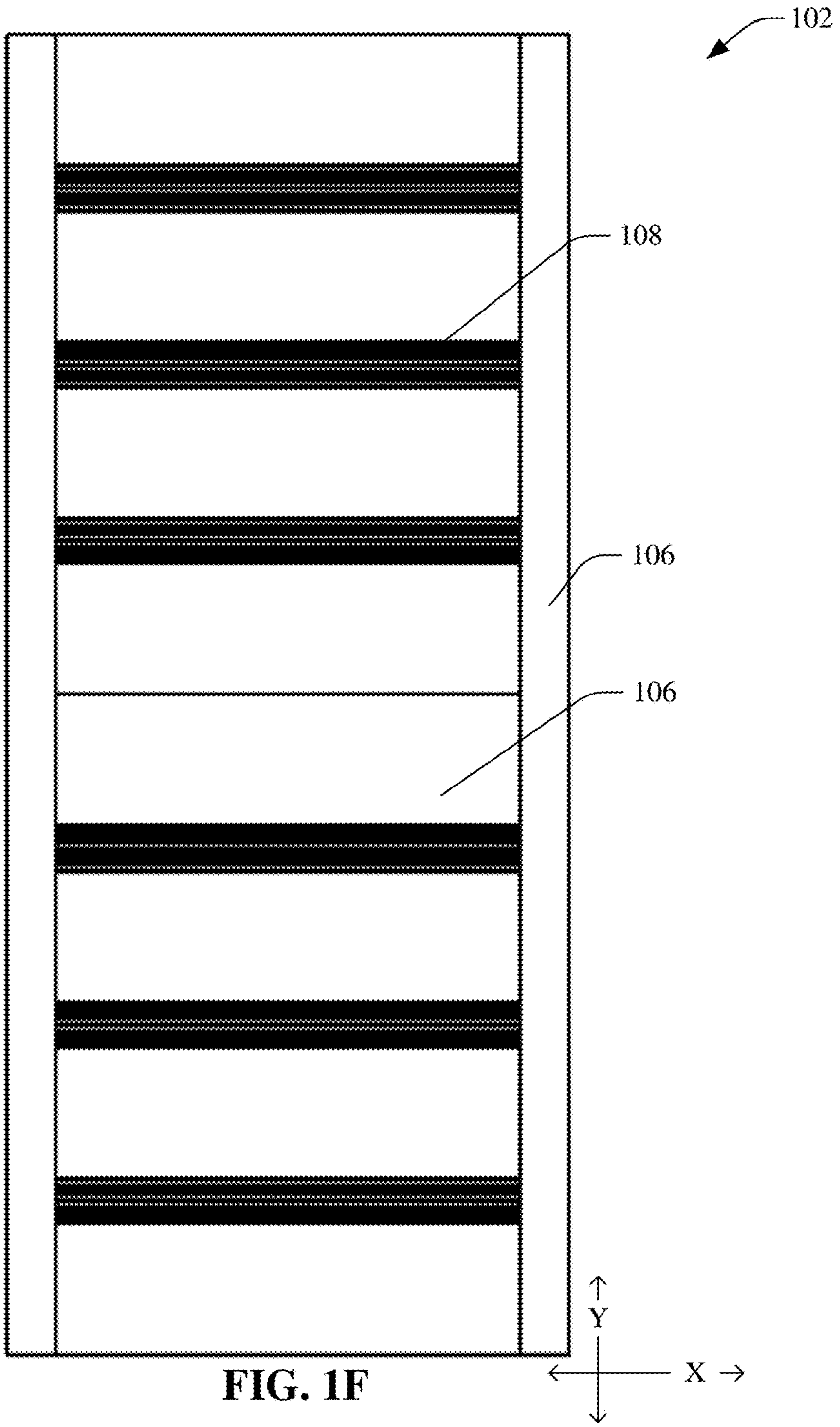
Figure 1H:
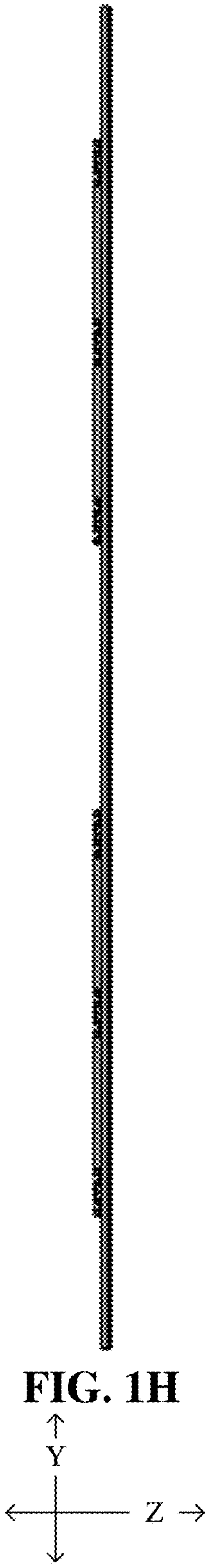
Figure 1G:
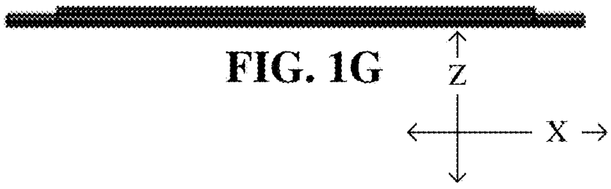

As shown in FIGS. 1F-1H, the tile panel 102 can comprise a vertical (e.g., portrait) orientation as compared to the horizontal (e.g., landscape) orientation of the tile panel 102 depicted in FIGS. 1A-1E. Horizontal orientations and vertical orientations can utilize like-components, however, different lengths and/or combinations of components can be utilized in different orientations of the tile panel 102.

Figure 2A:
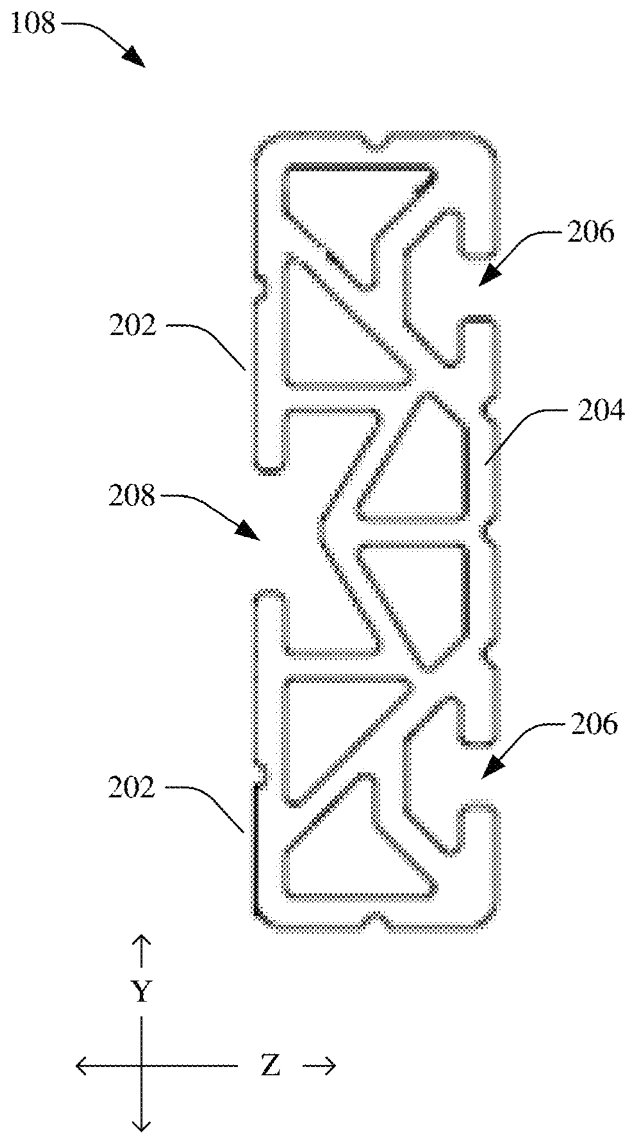
FIGS. 2A-2C illustrate diagrams of an example, non-limiting fastening track that can be included in one or more tile panels to facilitate a mechanical mounting system in accordance with one or more embodiments described herein.
Figure 2B:
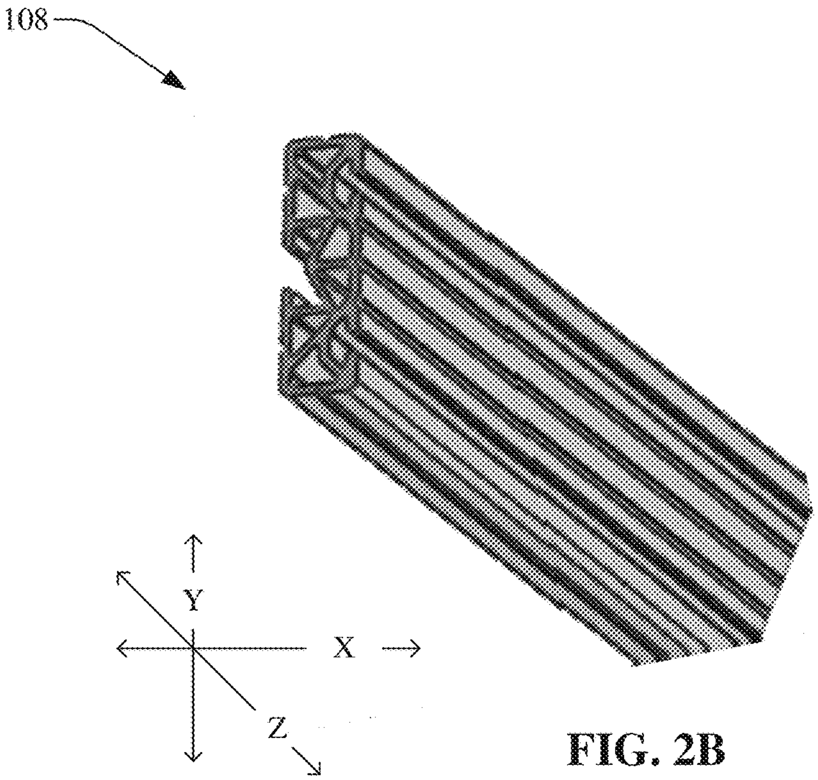
Figure 2C:
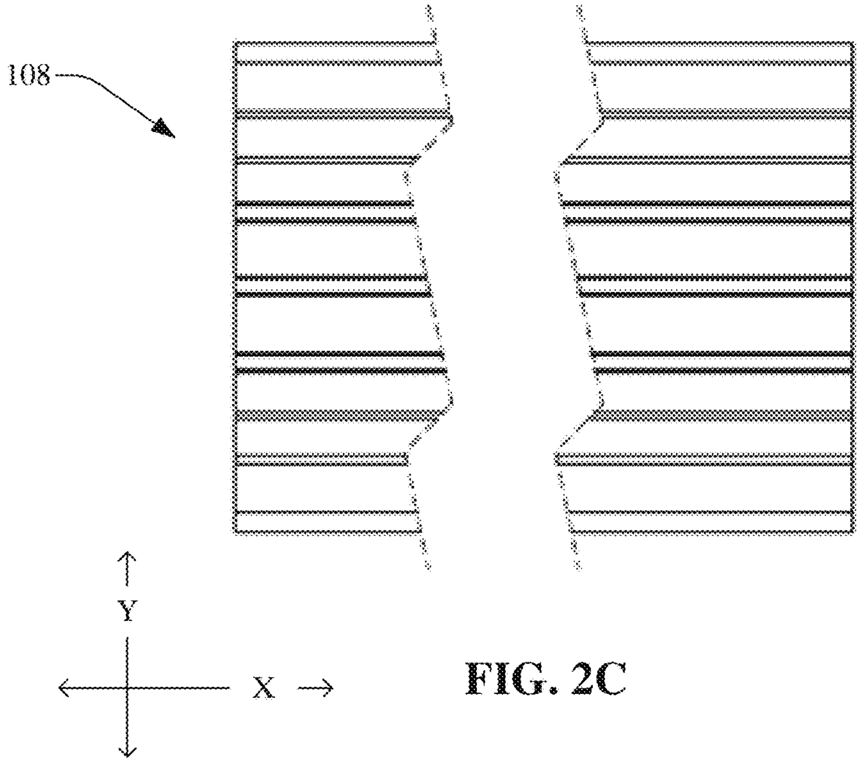

FIGS. 2A-2C illustrate diagrams of an example, non-limiting fastening track 108 in accordance with one or more embodiments described herein. Repetitive description of like elements employed in other embodiments described herein is omitted for the sake of brevity. FIG. 2A depicts a cross-sectional view of the fastening track 108. FIG. 2B depicts a three-dimensional ("3D") view of the fastening track 108. FIG. 2C depicts a side view of the fastening track 108. As shown in FIGS. 2A-2C, the one or more fastening tracks 108 can comprise a rectangular shape, however, alternative geometries are also envisaged. In one or more embodiments, the body of the fastening tracks 108 can be skeletonized (e.g., as shown in FIGS. 2A-2C). In this regard, one or more cavities can be present within the body structure of the fastening tracks 108 (e.g., to reduce weight and/or material cost in manufacturing). Alternatively, the body of the fastening tracks 108 can be solid, or substantially solid, along the thickness of the fastening tracks 108. The one or more fastening tracks 108 can comprise a rigid material such as, but not limited to, polyvinyl chloride ("PVC"), plastics, polymers, composites, a combination thereof, or another suitable plastic material. In further embodiments, the one or more fastening tracks 108 can additionally, or alternatively, be comprised of a metal (e.g., aluminum, steel, stainless steel, magnesium, copper, brass, bronze, zinc, alloys, or other suitable metals) or other suitable materials and/or combinations thereof. In some embodiments, the fastening tracks 108 can be cut to size (e.g., to correspond to a tile panel 102). In other embodiments, the fastening tracks 108 can be adjustable (e.g., slidably adjustable in length) to accommodate different sizes of tile panels 102. Such adjustable fastening tracks 108 can, in some embodiments, incorporate a French cleat locking system and/or a magnetic locking system in order to set fastening track length.

In various embodiments, and as shown in FIG. 2A, the one or more fastening tracks 108 can comprise a first surface 202 and/or a second surface 204. The first surface 202 can face, for example, toward the tile material 104. For instance, the first surface 202 can be adhered to the tile material 104 to form the back side 102*b* of the tile panel 102. The second surface 204 can face, for example, away from the tile material 104. For instance, the second surface 204 can be exposed on the back side 102*b* of the tile panel 102. Further, the second surface 204 can comprise one or more channels 206. In various embodiments, the one or more channels 206 can house the head of one or more fasteners (e.g., can house screw heads, bolt heads, and/or the like).

Figure 3A:
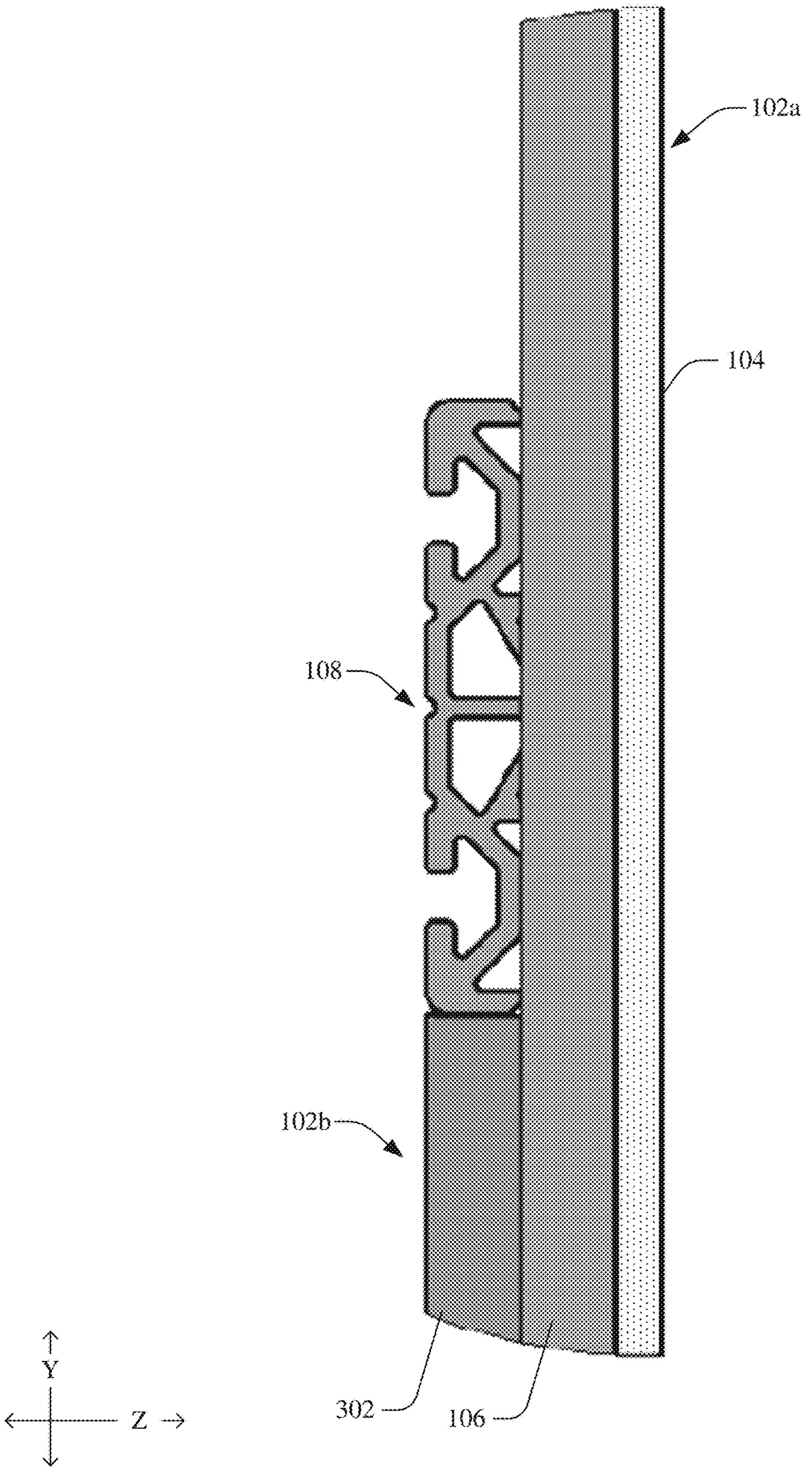
FIGS. 3A-3C illustrate diagrams of example, non-limiting cross-sectional views of a tile panel that can be mechanically mounted to a support structure in accordance with one or more embodiments described herein.
Figure 3B:
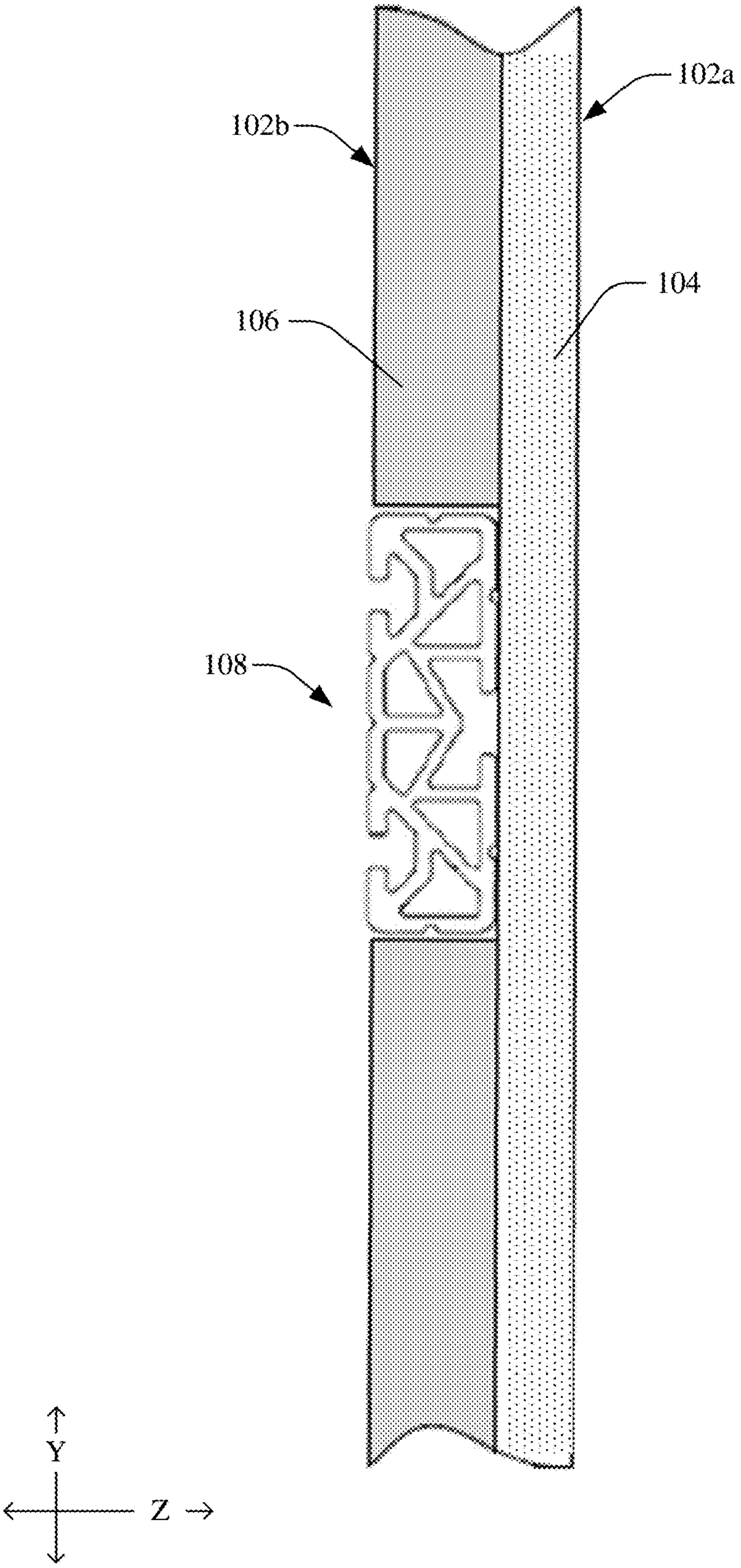
Figure 3C:
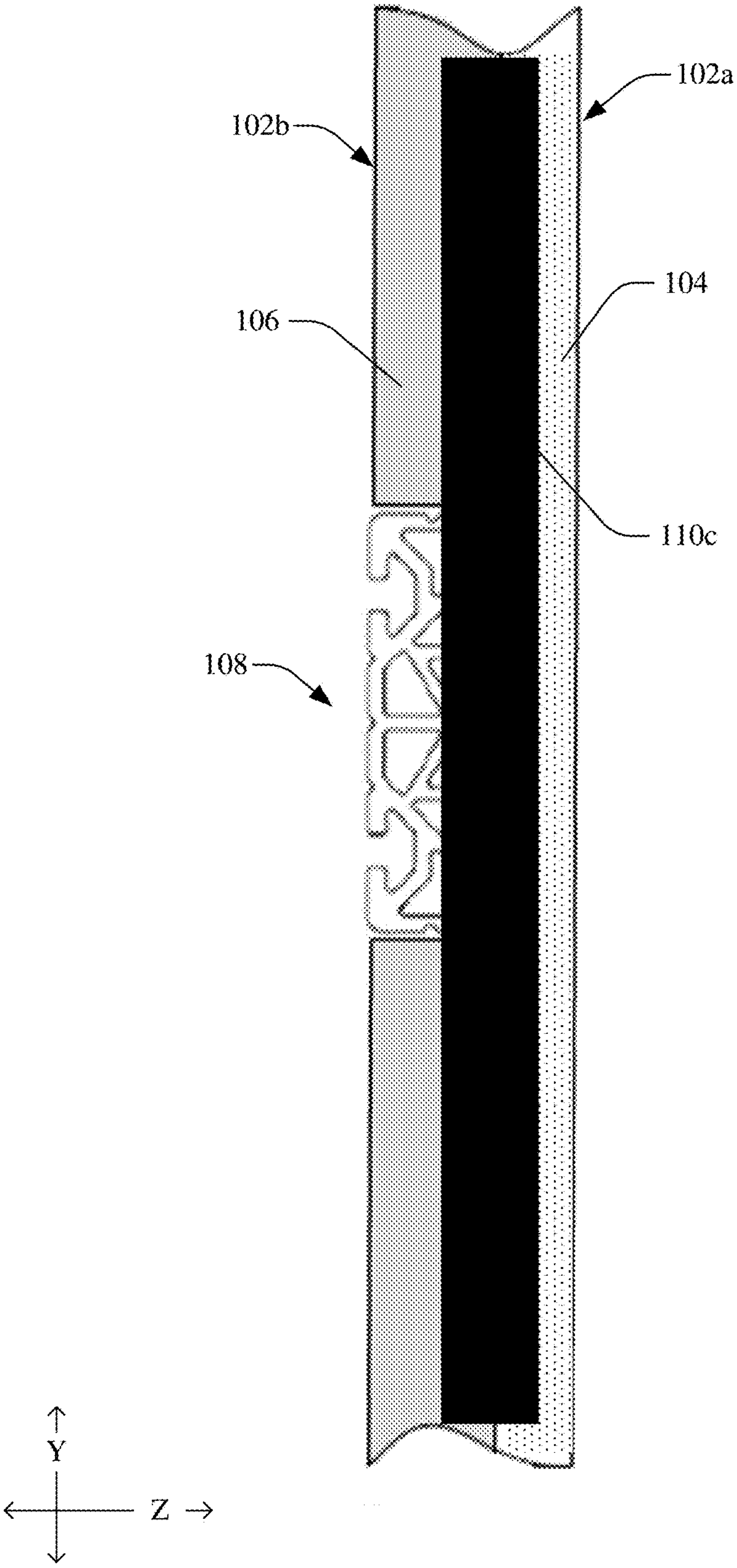

FIGS. 3A-3C illustrate diagrams of example, non-limiting cross-section views of a portion of the tile panel 102 in accordance with one or more embodiments described herein. Repetitive description of like elements employed in other embodiments described herein is omitted for the sake of brevity. In various embodiments, the one or more rigid substrates 106 and/or fastening tracks 108 can be adhered directly to the tile material 104 to form the back side 102*b* of the tile panel 102. In one or more embodiments, the tile panels 102 can be formed with the one or more rigid substrates 106 and/or fastening tracks 108, and then be subsequently cut to target dimensions. In various embodiments, the one or more rigid substrates 106 and/or fastening tracks 108 can improve the durability of the tile panels 102, as compared to a panel consisting solely of the tile material 104. The improved durability can facilitate sizing, transportation, and/or installation of the tile panels 102 without incurring damage. In various embodiments, and as shown in FIG. 3C, the tile panels 102 can optionally comprise one or more seal members 110*c* (e.g., a waterproof membrane) along one or more edges of the tile panel 102. The seal members 110*c* can comprise, for example, an elastic material that can facilitate forming a pressure seal between one or more surfaces and/or edges of the tile panel 102 and one or more external surfaces or edges of neighboring materials or components. It is noted that the seal members 110*c* can comprise one or more of a variety of materials, such as neoprene, rubber, silicone, nitrile, ethylene propylene diene terpolymer, fluoropolymer elastomer and/or synthetic rubber compounds, styrene butadiene, butadiene acrylonitrile, ethylene propylene, butyl, chlorosulfonated polyethylene, plastic, polymer, composite, or another suitable material and/or combination thereof that can be utilized to form a waterproof or water resistant seal. In various embodiments, the tile panel 102 can comprise a layer 302 as shown in FIG. 3A. The layer 302 can comprise one or more of a variety of materials. For instance, the layer 302 can comprise an additional layer of the rigid substrate 106 (e.g., fixed atop a base layer of the rigid substrate 106 to adjust thickness of the rigid substrate 106), a seal member 110 (e.g., a waterproof membrane), or another suitable layer.

Figure 4A:
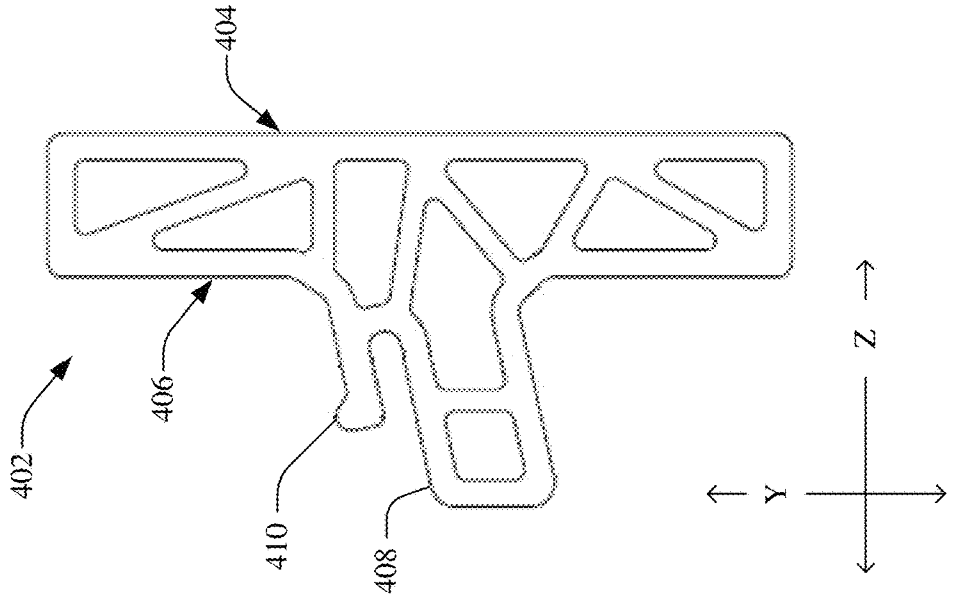
FIGS. 4A-4C illustrate diagrams of an example, non-limiting clip that can mechanically interlock one or more tile panels to one or more receiving bodies mounted to a support structure in accordance with one or more embodiments described herein.
Figure 4B:
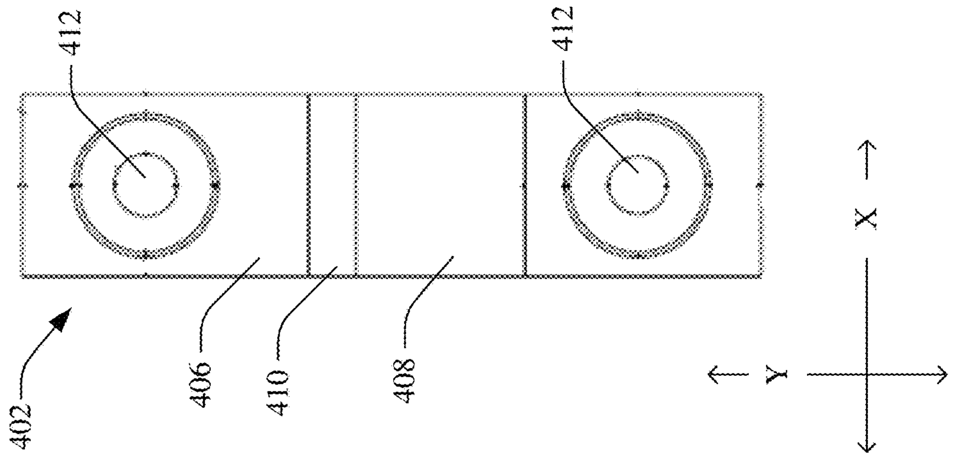
Figure 4C:
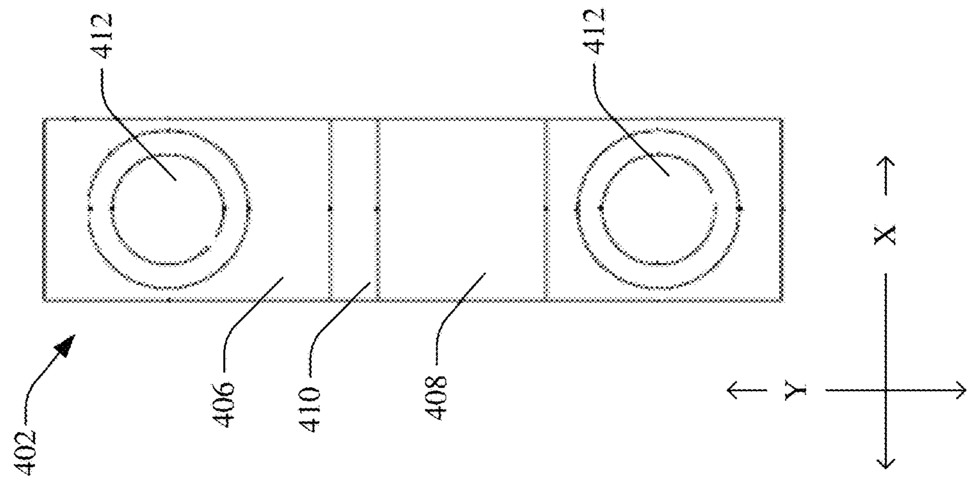
Figure 6:
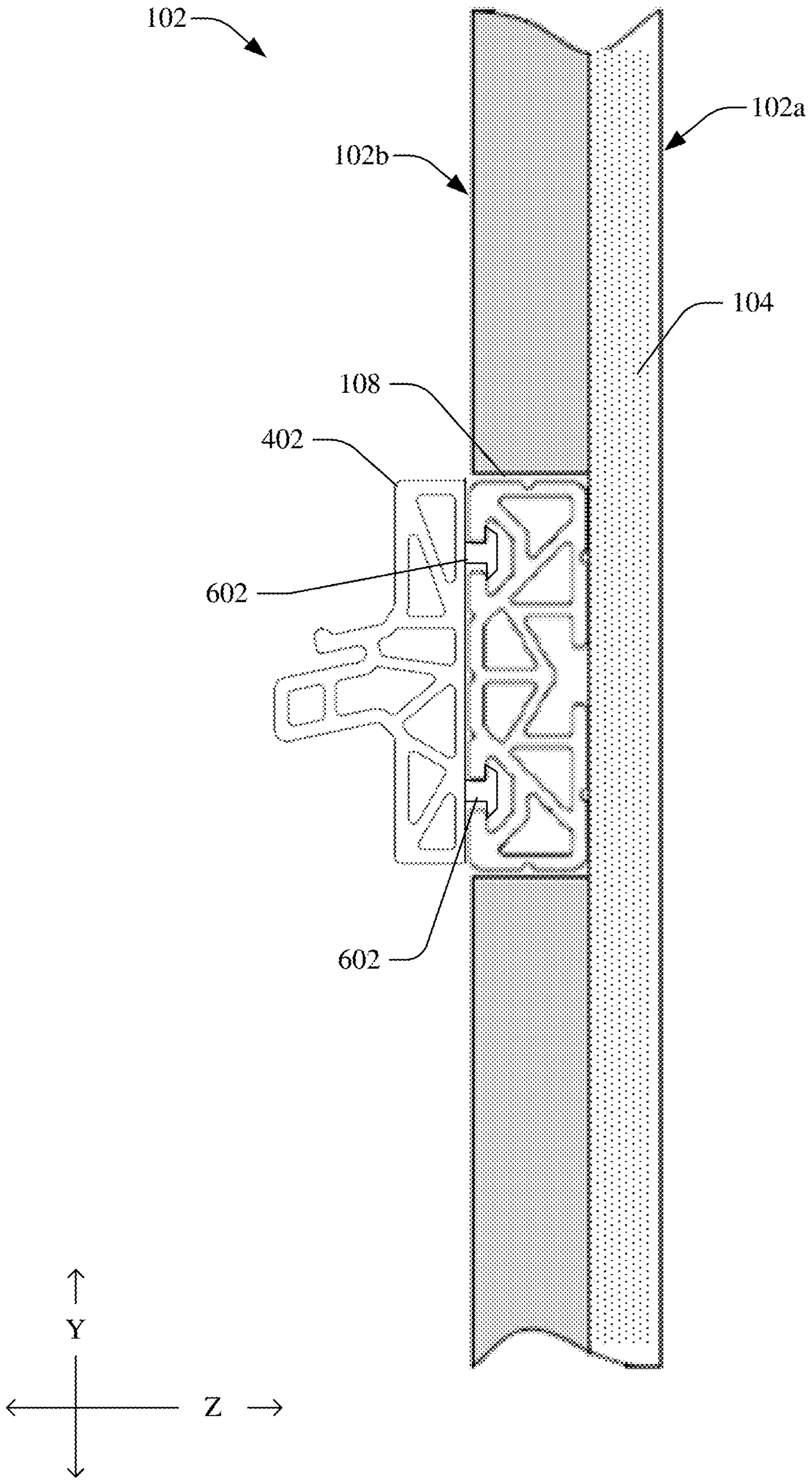
FIG. 6 illustrates a cross-sectional view of an example, non-limiting tile panel outfitted with a clip in accordance with one or more embodiments described herein.

FIGS. 4A-4C illustrate diagrams of an example, non-limiting clip 402 that can be attached to the one or more fastening tracks 108 in accordance with one or more embodiments described herein. FIG. 6 illustrates a cross-sectional view of an example, non-limiting tile panel 102 outfitted with a clip 402 in accordance with one or more embodiments described herein. Repetitive description of like elements employed in other embodiments described herein is omitted for the sake of brevity. In one or more embodiments, the body of the clips 402 can be skeletonized (e.g., as shown in FIG. 4A-4C). In this regard, one or more cavities can be present within the body structure of the clips 402 (e.g., to reduce weight and/or material cost in manufacturing). Alternatively, the body of the clips 402 can be solid, or substantially solid, along the thickness of the clips 402. The one or more clips 402 can comprise a rigid material such as, but not limited to, PVC, plastics, polymers, composites, a combination thereof, or another suitable plastic material. In further embodiments, the one or more clips 402 can additionally, or alternatively, be comprised of a metal (e.g., aluminum, steel, stainless steel, magnesium, copper, brass, bronze, zinc, alloys, or other suitable metals) or other suitable materials and/or combinations thereof.

FIG. 4A depicts a side view of the clip 402. As shown in FIG. 4A, the clip 402 can comprise a mounting surface 404 (e.g., a first side of the clip 402) and/or locking surface 406 (e.g., a second side of the clip 402). Further, one or more projections can extend from the locking surface 406. For example, a main projection 408 and/or a lock projection 410 can extend from the locking surface 406.

Figure 5:
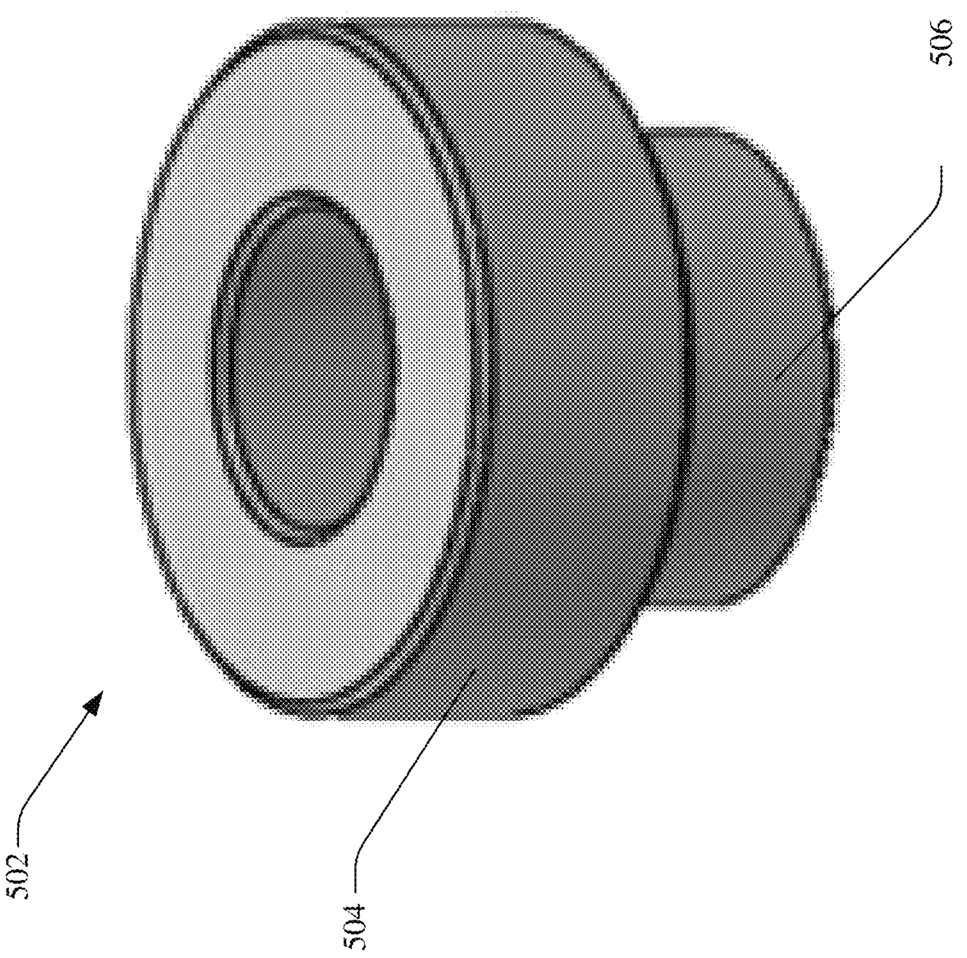
FIG. 5 illustrates a diagram of an example, non-limiting spacer in accordance with one or more embodiments described herein.

As shown in FIGS. 4B-C, the mounting surface 404 and/or locking surface 406 can further comprise one or more holes 412. In various embodiments, fasteners can extend through the one or more holes 412 and engage with the channels 206 of the fastening tracks 108 to facilitate securing the one or more clips 402 to the one or more fastening tracks 108. FIG. 4B depicts an example configuration of a fixed clip 402 that can be employed to fix the clip 402 directly to the fastening track 108. FIG. 4C depicts an example configuration of a floating clip 402 that can be employed to fix the clip 402 to the fastening track 108 with a defined space (e.g., a defined distance) between the clip 402 and the fastening track 108. For example, the hole 412 in the mounting surface 404 of the floating clip 402 can be larger than the hole 412 in the mounting surface 404 of the fixed clip 402. In this regard, the holes 412 of the floating clip 402 (e.g., shown in FIG. 4C) can house a spacer 502 (see, e.g., FIG. 5). For instance, when inserted into the holes 412, the collar 504 of the spacer 502 can abut the body of the clip 402 while the body 506 of the spacer 502 can extend through the hole 412 and space the clip 402 from the fastening track 108 by a defined distance.

FIG. 6 depicts an exemplary embodiment in which the clip 402 can be secured directly to the fastening track 108 via one or more fasteners 602 (e.g., a t-nut or another suitable nut or fastener, bolt, screw, nail, staple, and/or the like). As shown in FIG. 6, when secured to the fastening track 108, the mounting surface 404 (e.g., or the spacer 502) can be pressed against the second surface 204 of the fastening track 108. FIG. 6 illustrates an exemplary orientation of the clip 402 on the fastening track 108, however, alternate orientations (e.g., in relation to the X and Y axis) are also envisaged (e.g., thereby enabling vertical or horizontal mounting of the tile panel 102). For instance, FIG. 6 depicts the clip 402 simultaneously engaged with two separate channels 206 of the fastening track 108 to facilitate mounting the exemplary tile panel 102 shown in FIGS. 1A-1E in a horizontal orientation. Alternatively, the clip 402 utilize fasteners 602 to engage with two respective points in the same channel 206 of the fastening track 108 to facilitate mounting the exemplary tile panel 102 shown in a vertical (e.g., portrait) orientation (see, e.g., FIGS. 1F-H). It is noted that, while the fastening tracks 108 are preferably secured to one or more clips 402, the fastening tracks 108 can be directly adhered (e.g., using an epoxy, a polyester adhesive, a marine grade adhesive, etc.) to drywall in alternative embodiments.

Figure 7A:
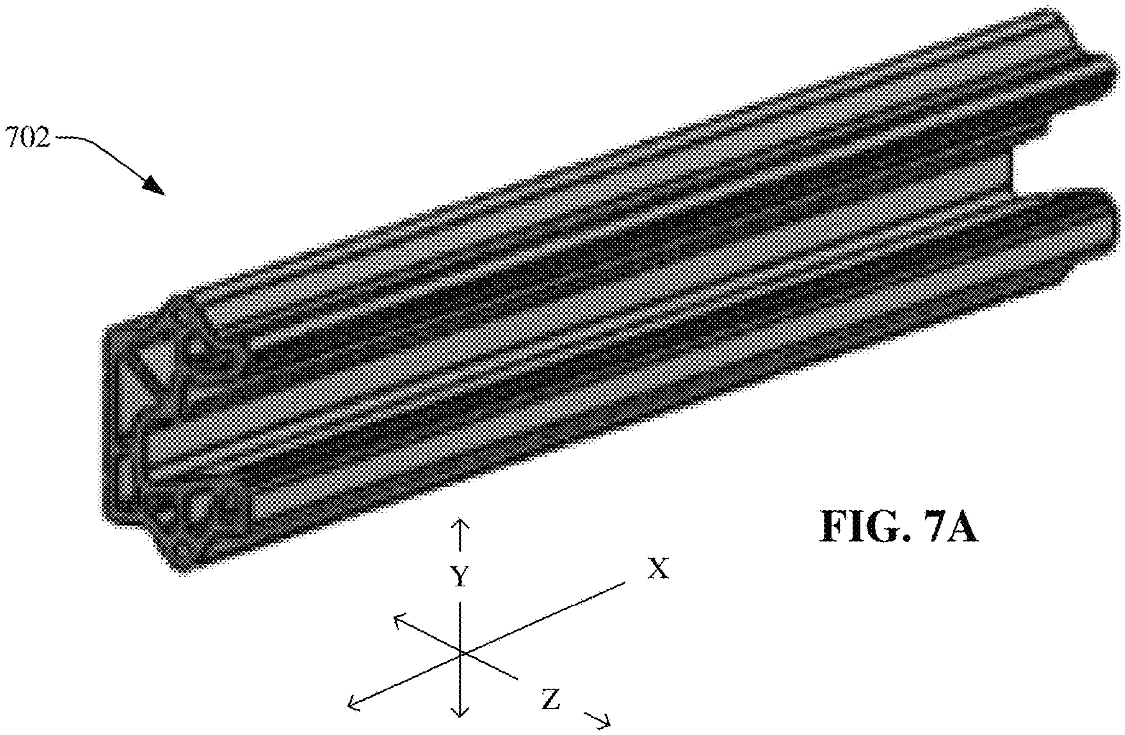
FIGS. 7A-7C illustrate diagrams of an example, non-limiting receiving body that can facilitate mounting a tile panel to a support structure in accordance with one or more embodiments described herein.
Figure 7B:
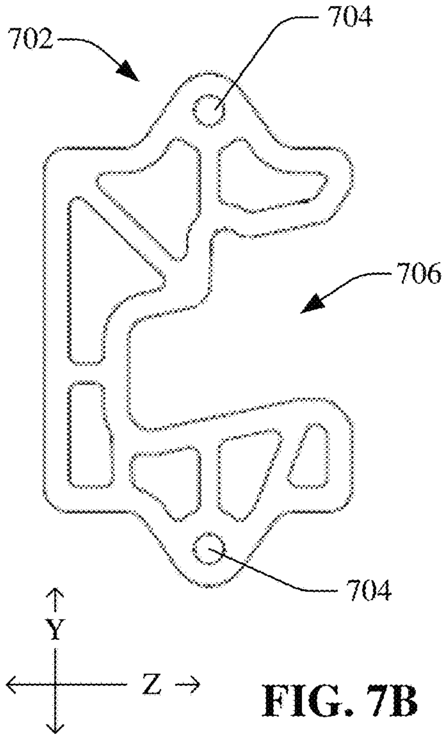
Figure 7C:
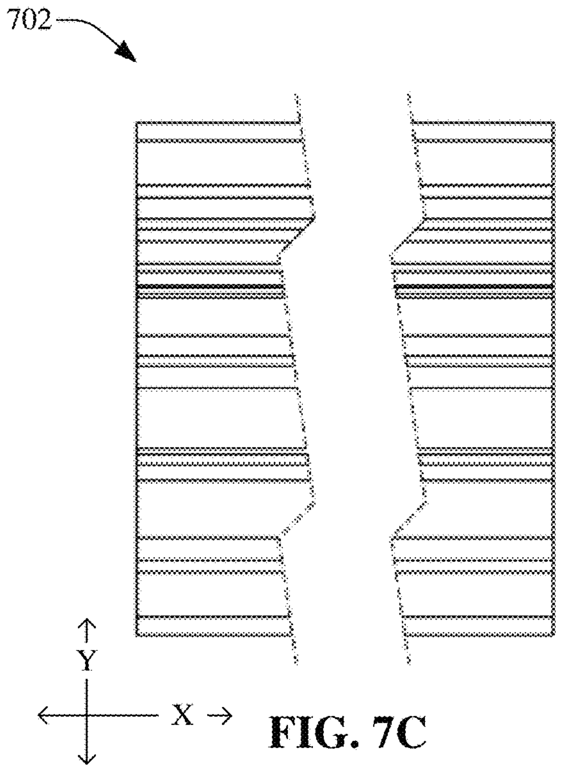

FIGS. 7A-7C illustrate diagrams of an example, non-limiting receiving body 702 in accordance with one or more embodiments described herein. FIG. 7A illustrates a 3D view of the receiving body 702. FIG. 7B illustrates a cross-sectional view of the receiving body 702. FIG. 7C illustrates a side of the receiving body 702. Repetitive description of like elements employed in other embodiments described herein is omitted for the sake of brevity. In one or more embodiments, the receiving body 702 can be skeletonized (e.g., as shown in FIGS. 7A-7B). In this regard, one or more cavities can be present within the architecture of the receiving body 702 (e.g., to reduce weight and/or material cost in manufacturing). Alternatively, the architecture of the receiving body 702 can be solid, or substantially solid, along the thickness of the receiving body 702. The one or more receiving bodies 702 can comprise a rigid material such as, but not limited to, PVC, plastics, polymers, composites, a combination thereof, or another suitable plastic material. In further embodiments, the one or more receiving bodies 702 can additionally, or alternatively, be comprised of a metal (e.g., aluminum, steel, stainless steel, magnesium, copper, brass, bronze, zinc, alloys, or other suitable metals) or other suitable materials and/or combinations thereof.

As shown in FIGS. 7A-7B, the receiving body 702 can comprise one or more mounting channels 704 to facilitate securing the receiving body to a support structure. For example, FIGS. 7A-7B illustrate an exemplary embodiment in which the receiving body 702 comprises two mounting channels 704 (e.g., positioned at the top and bottom of the receiving body 702). In various embodiments, the mounting channels 704 can accept one or more fasteners (e.g., screws, nails, staples, and/or the like). Additionally, the receiving body 702 can comprise a locking channel 706. The size, shape, and/or dimensions of the locking channel 706 can vary based on the geometry of the one or more clips 402. In this regard, the locking channel 706 can comprise various suitable cavities. For example, the shape of the locking channel 706 can match the periphery of the projections (e.g., main projection 408 and/or lock projection 410) extending from the locking surface 406 of the clip 402. For instance, the shape of the locking channel 706 and the shape of the clip 402 projections (e.g., main projection 408 and/or lock projection 410) can complement each other such that the clip 402 projections (e.g., main projection 408 and/or lock projection 410) can fit within the locking channel 706.

Figure 8A:
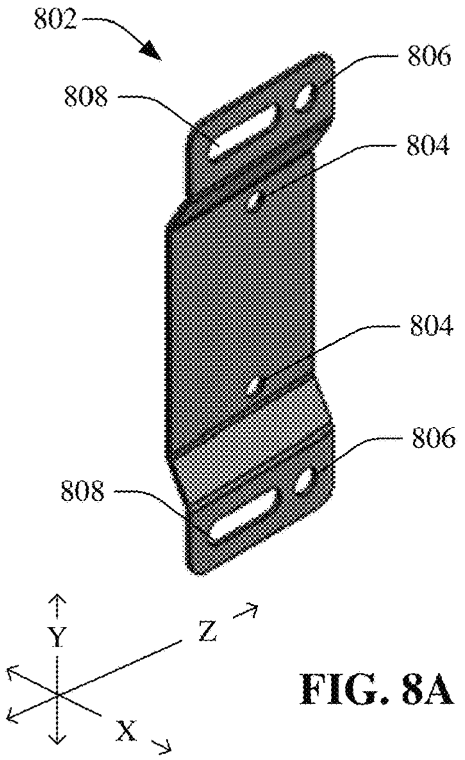
FIGS. 8A-8C illustrate diagrams of an example, non-limiting mounting bracket that can facilitate fastening a receiving body to a support structure to mount a tile panel in accordance with one or more embodiments described herein.
Figure 8B:
Figure 8C:
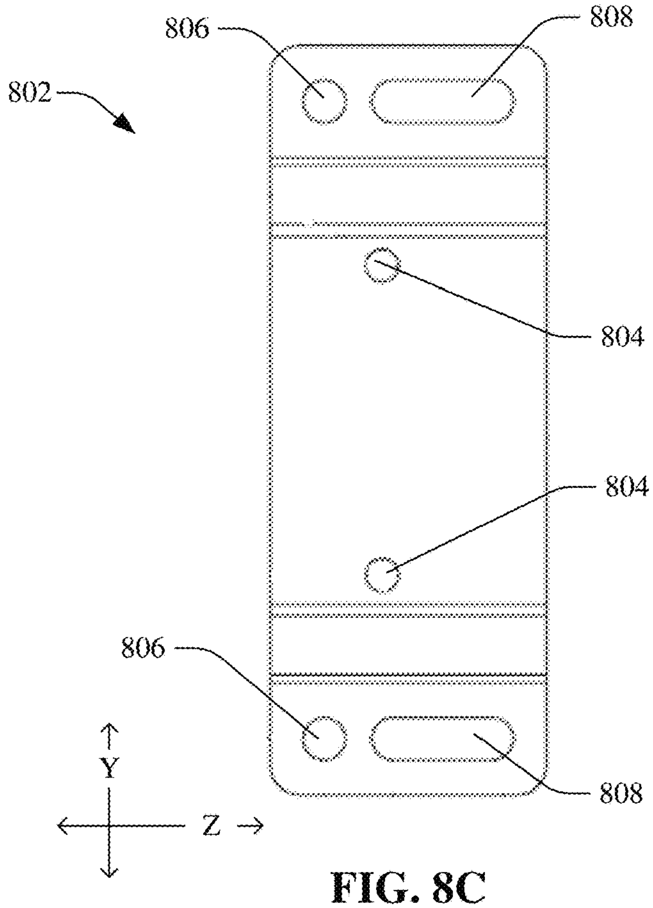

FIGS. 8A-8C illustrate diagrams of an example, non-limiting mounting bracket 802 in accordance with various embodiments described herein. FIG. 8A depicts a 3D view of the mounting bracket 802. FIG. 8B depicts a side view of the mounting bracket 802. FIG. 8C depicts a front surface of the mounting bracket 802. Repetitive description of like elements employed in other embodiments described herein is omitted for the sake of brevity. In various embodiments, mounting brackets 802 can be comprised of a metal, though other suitable materials such as plastic materials (e.g., PVC, plastics, polymers, composites, a combination thereof, or another suitable plastic material) can be utilized. A mounting bracket 802 can be mounted to each end of the receiving body 702 (e.g., at a first end of the receiving body 702 and at a second end of the receiving body 702, opposite the first end) to facilitate securing the receiving body 702 to a support structure. For example, the receiving body 702 can be cut to shorten the length of the receiving body 702 (e.g., along the X axis) to a target length. Subsequent to the cut, mounting brackets 802 can be fastened to the distal ends of the receiving body 702 such that the locking channel 706 extends between two mounting brackets 802.

In various embodiments, the mounting brackets 802 can comprise one or more mounting holes 804 that can align with the mounting channels 704 of the receiving body 702. For instance, one or more fasteners (e.g., screws, nails, staples, and/or the like) can pass through the mounting holes 804 and engage the mounting channels 704 to mount the mounting brackets 802 to the receiving body 702. Additionally, the mounting brackets 802 can comprise one or more fastening holes 806. In various embodiments, one or more fasteners (e.g., screws, nails, staples, and/or the like) can pass through the one or more fastening holes 806 and/or fastening slots 808 and into the support structure to fix the receiving body 702 to the support structure. For instance, a receiving body 702 can be cut to fit between the framing studs of a wall. The mounting brackets 802 can be attached to the ends of the cut receiving body 702. The receiving body 702 with mounting brackets 802 can then be positioned between the wall studs. Further, the mounting brackets 802 can be secured to the studs via fasteners (e.g., screws, nails, staples, and/or the like). As shown in FIGS. 8A-8C, one or more of the fastening slots 808 can be elongated to enable the mounting bracket 802 to be repositioned along the Z axis without unfastening the mounting bracket 802 from the support structure. For instance, the mounting bracket 802 can be moved along the depth of a stud bay of a wall (e.g., along the Z axis) during installation of the tile panel 102 to facilitate mounting the tile panel 102 plumb to the wall.

Figure 9:
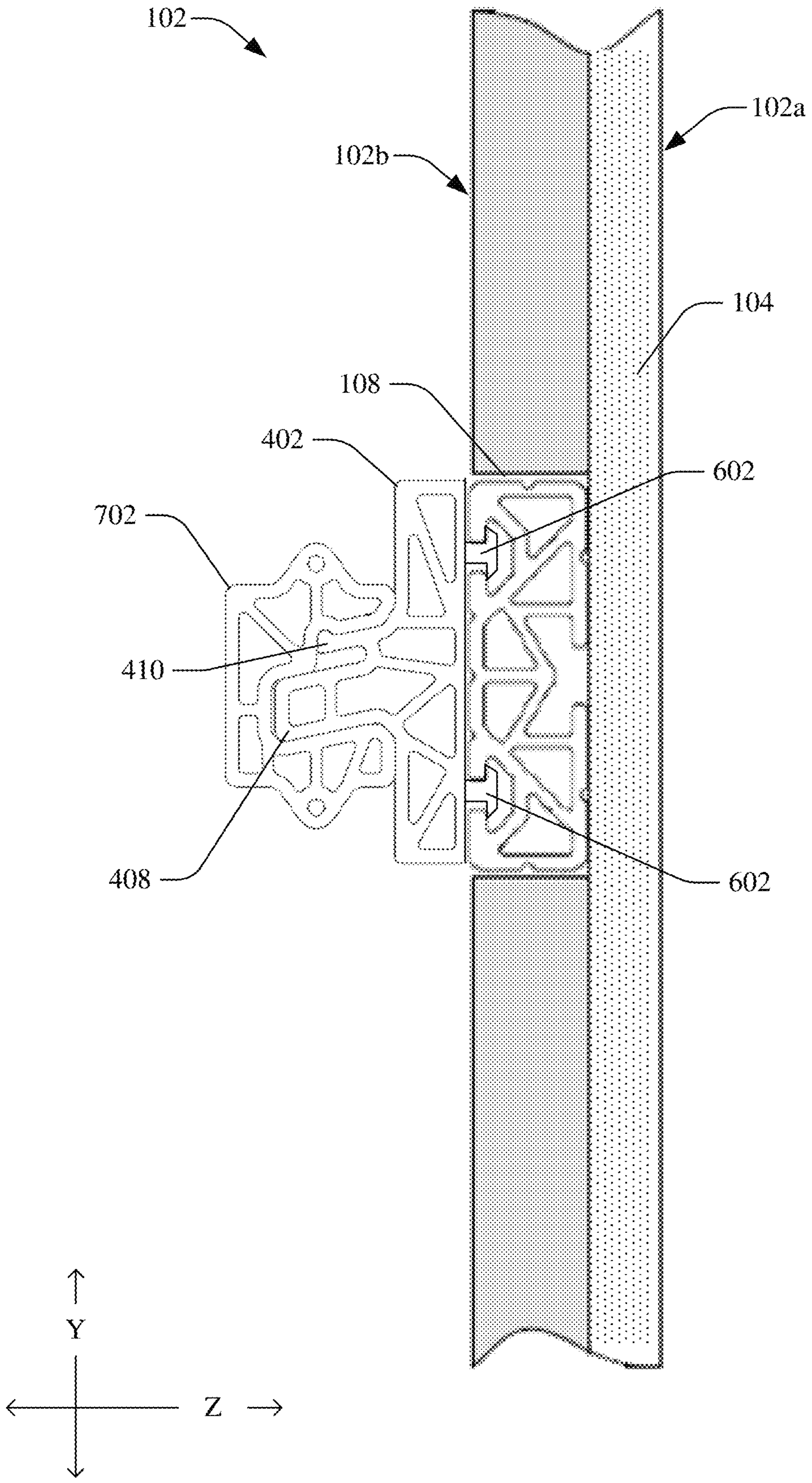
FIG. 9 illustrates a diagram of an example, non-limiting cross-sectional view of a tile panel mechanically attached to a receiving body via a clip in accordance with one or more embodiments described herein.

FIG. 9 illustrates a diagram of an example, non-limiting cross-sectional view of a tile panel 102 mechanically attached to a receiving body 702 via clip 402 in accordance with one or more embodiments described herein. Repetitive description of like elements employed in other embodiments described herein is omitted for the sake of brevity. As shown in FIG. 9, the clip 402 can achieve a mechanical attachment between the fastening track 108 and the receiving body 702. In this regard, the tile material 104 can be mounted to a support structure (e.g., where the receiving body 702 is fixed between wall studs).

In various embodiments, the projections of the clip 402 can be pushed into the locking channel 706 to mount the tile panel 102 to the receiving body 702. For instance, a protrusion (e.g., a bump, ridge, and/or enlarged portion) can be located at the distal end of the lock projection 410 (e.g., as shown in FIG. 4A, FIG. 6, and/or FIG. 9), which can correspond to one or more cavities of the locking channel 706. When the clip 402 is fully inserted into the locking channel 706, the protrusion at the distal end of the lock projection 410 can fit within a corresponding groove (e.g., cavity) in the locking channel 706. For example, pushing the clip 402 into the locking channel 706 can squeeze the lock projection 410 toward the main projection 408. Once the protrusion of the lock projection 410 reaches the designated groove within the locking channel 706, the pressure applied to the lock projection 410 can be released as the lock projection has room to expand into the groove and re-establish its resting geometry. Further, the position of the lock projection 410 within the groove of the locking channel 706 can prevent the clip 402 and receiving body 702 from pulling away from each other. In this regard, the clip 402 and the receiving body 702 can comprise a snap-in interlocking mechanism. Additionally, the main projection 408 can abut against the interior walls of the locking channel 706 such that the weight of the tile panel 102 can be transferred to the receiving body 702 through the main projection 408.

Figure 10:
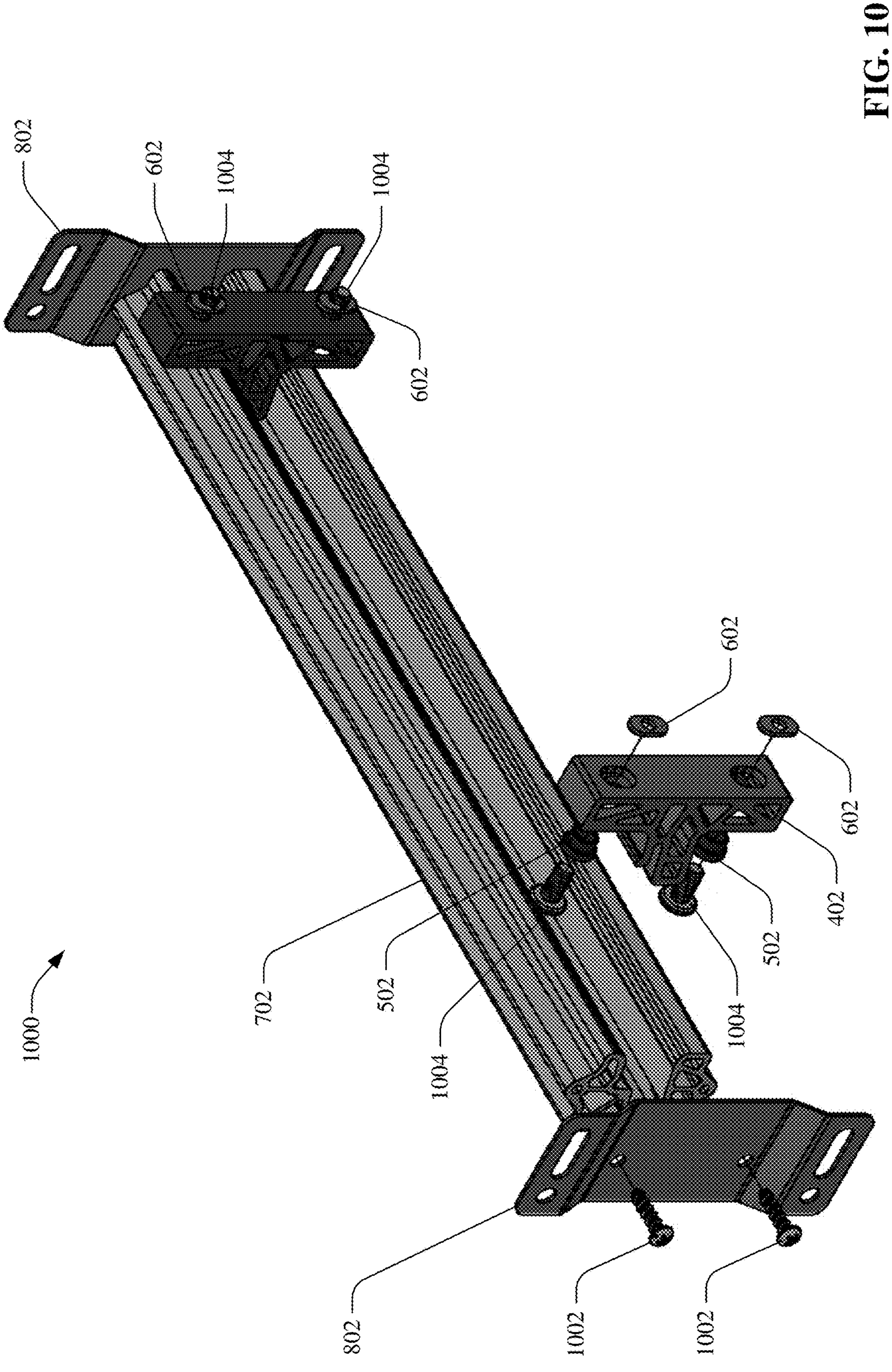
FIG. 10 illustrates a diagram of an example, non-limiting partial assembly of a tile panel mounting system in accordance with one or more embodiments described herein.

FIG. 10 illustrates a diagram of an example, non-limiting exploded view of an assembly 1000 comprising the receiving body 702 and two clips 402 in accordance with one or more embodiments described herein. Repetitive description of like elements employed in other embodiments described herein is omitted for the sake of brevity. As shown in FIG. 10, screws 1002 can be employed to fix the mounting brackets 802 to the ends of the receiving body 702. For illustrative clarity, the fastening track 108 is not depicted in FIG. 10. FIG. 10 exemplifies how fasteners (e.g., nuts, bolts, and/or the like) can be employed to pass through the holes 412 of the clip 402 and establish a means of connection to a fastening track 108. The left clip 402 shown in FIG. 10 exemplifies a floating clip 402 configuration (e.g., as shown in FIG. 4C), and the right clip 402 shown in FIG. 10 exemplifies a fixed clip 402 configuration (e.g., as shown in FIG. 4B). In various embodiments, fastener 1004 (e.g., a screw, nail, staple, bolt, and/or the like) can engage with the fastener 602 (e.g., a t-nut or another suitable nut or fastener) to secure the clip 402 to a fastening track 108. In some embodiments, the spacer 502 can be received between the fastener 1004 and the fastener 602.

Figure 11:
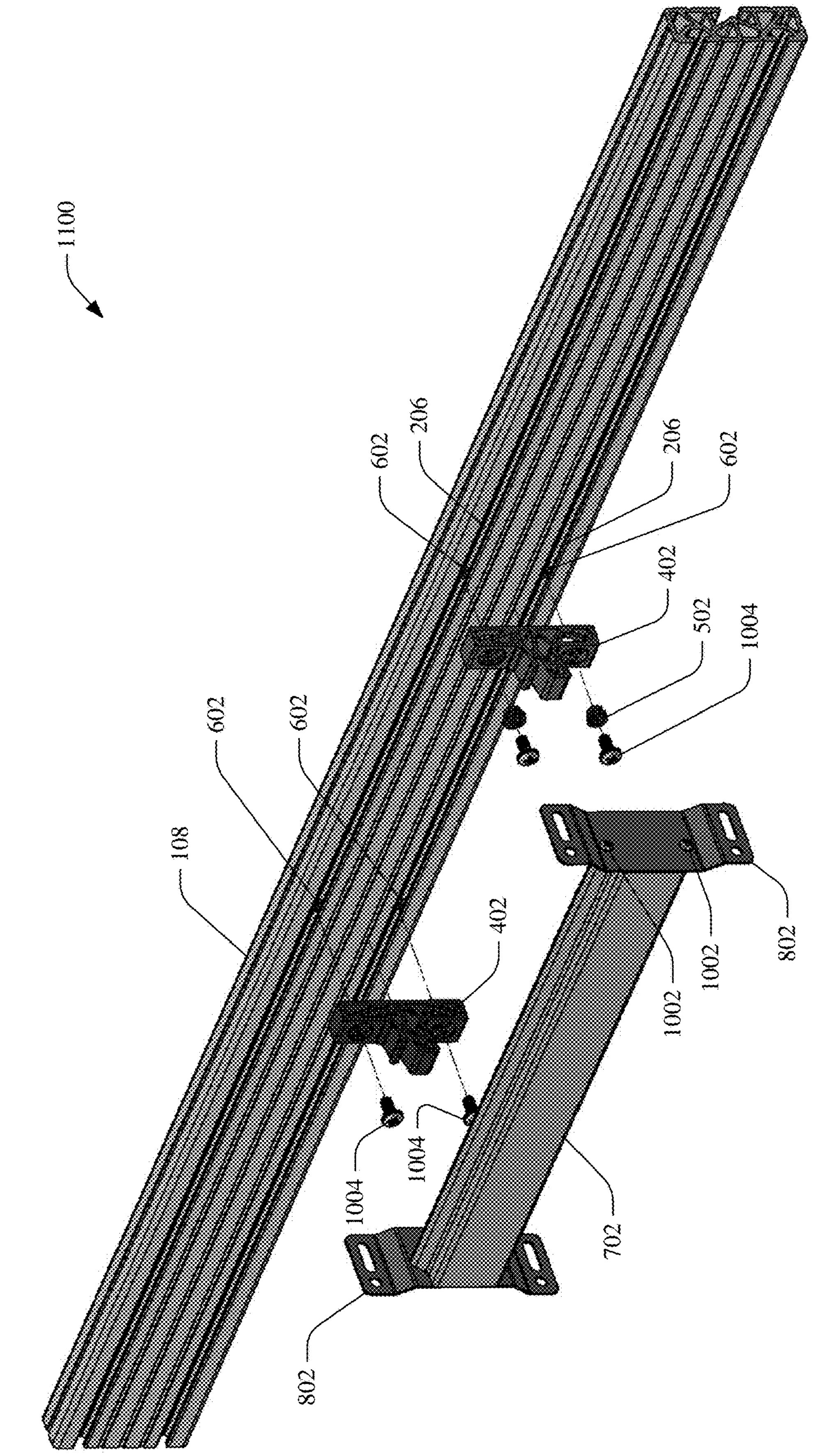
FIG. 11 illustrates a diagram of an example, non-limiting partial assembly of a tile panel mounting system in accordance with one or more embodiments described herein.

FIG. 11 illustrates a diagram of an example, non-limiting exploded view of an assembly 1100 comprising the receiving body 702 and two clips 402, and further comprising the fastening track 108 in accordance with one or more embodiments described herein. Repetitive description of like elements employed in other embodiments described herein is omitted for the sake of brevity. As shown in FIG. 11, the clips 402 can be fixed to the fastening track 108 via fasteners (e.g., bolts and/or nuts) that extend through the holes 412 of the clips 402 and engage the channels 206 of the fastening track 108. The left clip 402 shown in FIG. 11 exemplifies a fixed clip 402 configuration (e.g., as shown in FIG. 4B), and the right clip 402 shown in FIG. 11 exemplifies a floating clip 402 configuration (e.g., as shown in FIG. 4C).

Figure 12B:
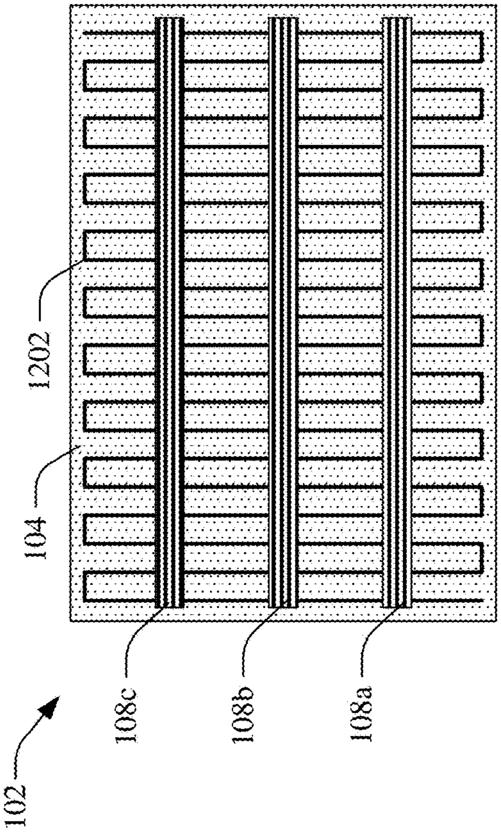
FIGS. 12A-12C illustrate diagrams of example, non-limiting stages of manufacturing a tile panel that can be mounted to a support structure via mechanical means in accordance with one or more embodiments described herein.
Figure 12A:
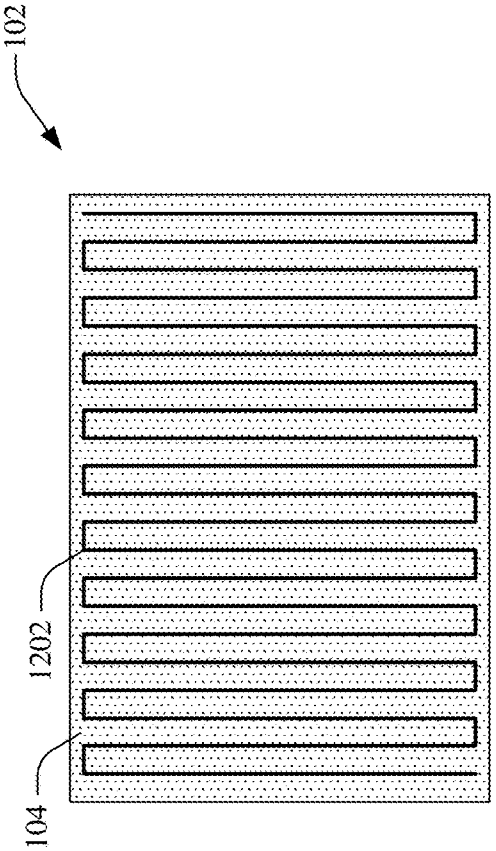
Figure 12C:
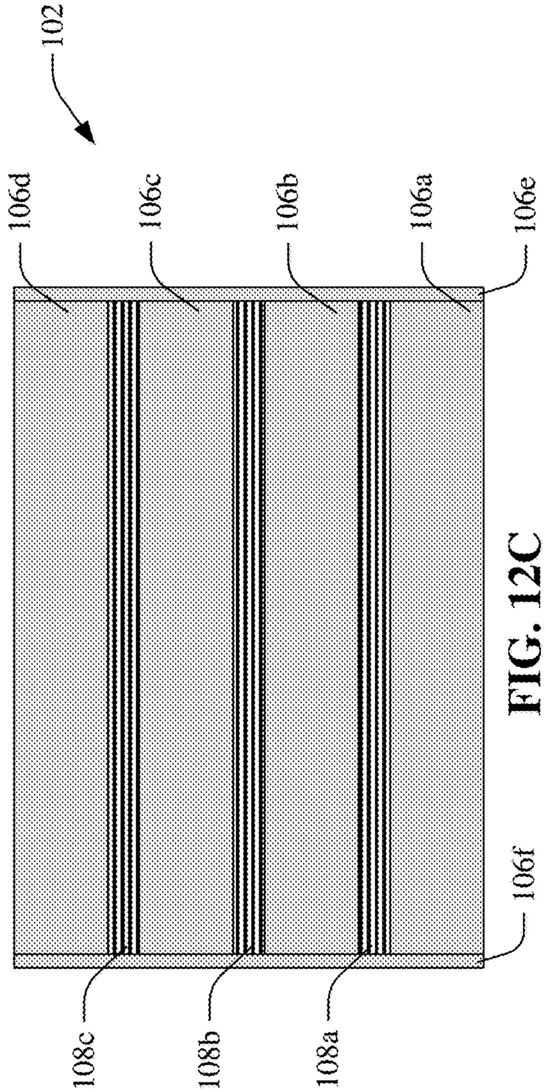

FIGS. 12A-12C illustrate diagrams of an example, non-limiting tile panel 102 during manufacturing (e.g., associated with process 2100 or another suitable process herein) in accordance with one or more embodiments described herein. Repetitive description of like elements employed in other embodiments described herein is omitted for the sake of brevity. FIG. 12A depicts an adhesive layer 1202 being deposited onto a tile material 104. In some embodiments, the adhesive layer 1202 can be deposited onto the tile material 104 using automated robotic equipment. As shown in FIG. 12A, the adhesive layer 1202 can be deposited onto the tile material 104 in one or more patterns to cover the surface area of the tile material 104. FIG. 12B depicts three fastening tracks 108 being positioned onto the adhesive layer 1202. As shown in FIG. 12B, the fastening tracks 108 can be placed onto the adhesive layer 1202 such that the fastening tracks 108 are adhered to the tile material 104. FIG. 12C depicts sections of rigid substrate 106 being positioned onto the adhesive layer 1202. As shown in FIG. 12C, the rigid substrate 106 can be placed onto the adhesive layer 1202 such that the rigid substrate 106 is adhered to the tile material 104 between the fastening tracks 108 and/or at distal ends of the fastening tracks 108.

Figure 13A:
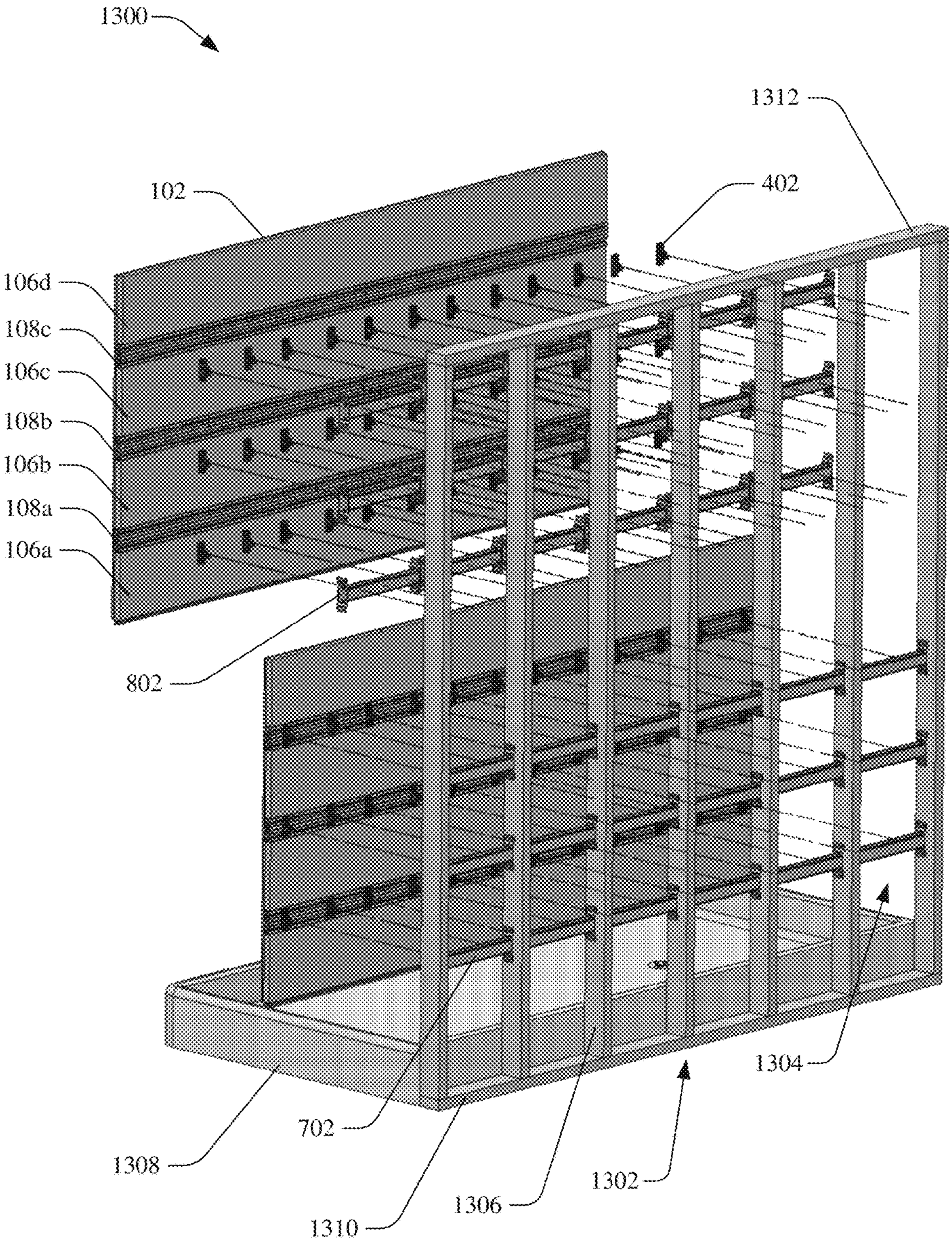
FIGS. 13A-13C illustrate diagrams of an example, non-limiting tile panel installation via a mechanical interlocking system in accordance with one or more embodiments described herein.
Figure 13B:
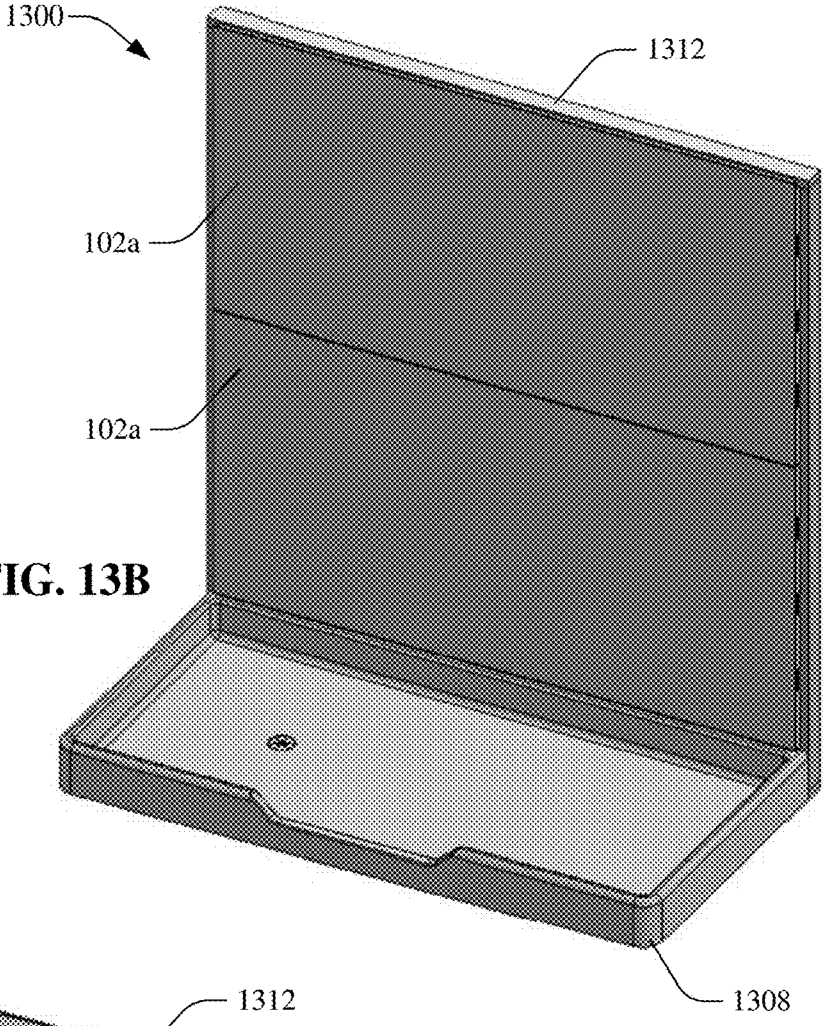
Figure 13C:
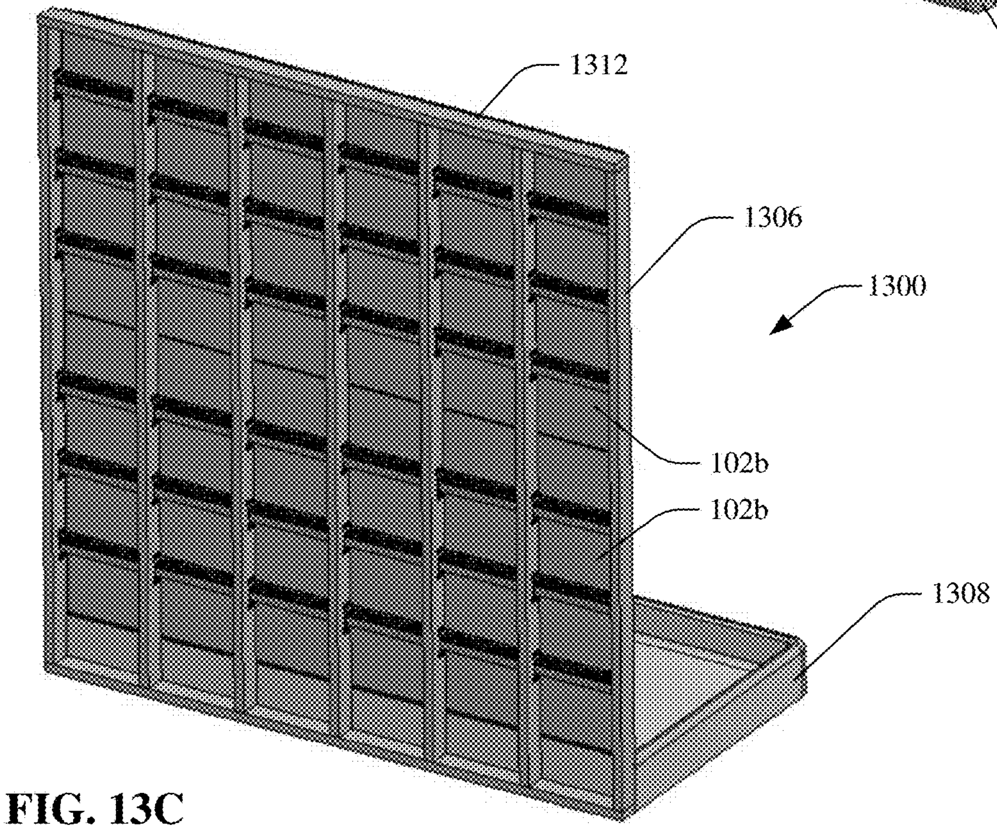

FIGS. 13A-13C illustrate diagram of an example, non-limiting installation 1300 of two tile panels 102 performed in accordance with various processes and/or various embodiments described herein. Repetitive description of like elements employed in other embodiments described herein is omitted for the sake of brevity. FIGS. 13A-13C depict the installation 1300 of two tile panels 102 with regard to a shower wall 1302. FIG. 13A depicts an exploded view of the assembly 1100 with reference to corresponding tile panels 102 and a shower wall 1302 comprising stud bays 1304 (e.g., between wall studs 1306). FIG. 13B depicts the front side 102*a* of the mounted tile panels 102, and FIG. 13C depicts the back side 102*b* of the mounted tile panels 102. In various embodiments, the installation 1300 can comprise a shower pan 1308 located at a bottom of the shower wall 1302. In various embodiments, the installation 1300 can comprise waterproofing materials (e.g., a seal member 110 or another suitable waterproofing material or sealant) received on a support structure (e.g., bottom plate 1310, top plate 1312, and/or wall studs 1306). For example, waterproofing materials can be installed on the support structure prior to mounting the receiving bodies 702. For instance, where the tile panels 102 are to be mounted to shower walls, a waterproof skirting can be installed where the wall studs 1306 meet the shower pan (e.g., shower pan 1308). The waterproof skirting can extend over a portion of the shower pan and up a portion of the studs. Further the waterproof skirting can be sealed using caulking and/or flashing tape.

Figure 14A:
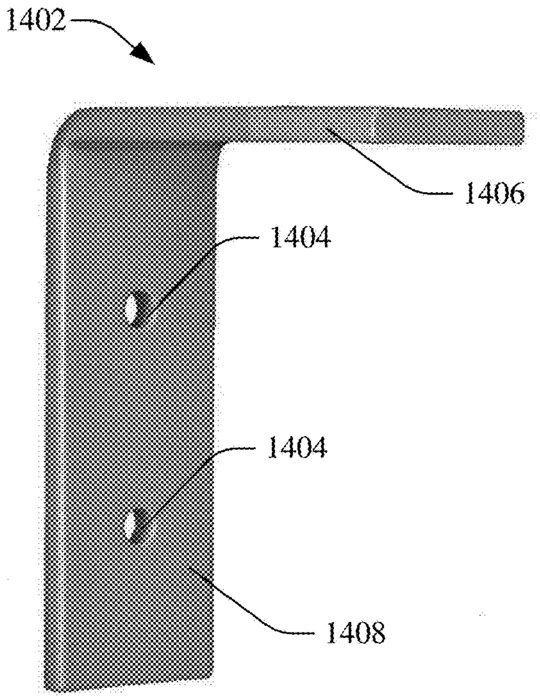
FIGS. 14A-14C illustrate diagrams of an example, non-limiting locking bracket in accordance with one or more embodiments described herein.
Figure 14B:
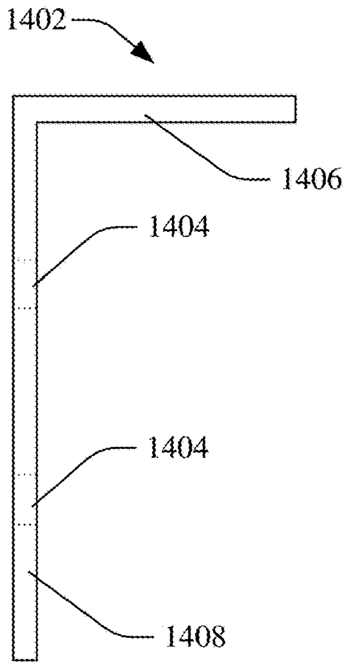
Figure 14C:
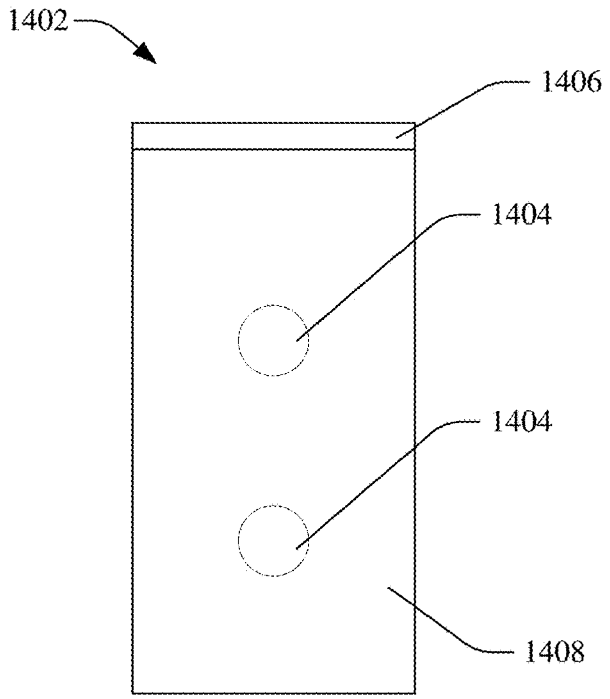

FIGS. 14A-14C illustrate diagrams of an example, non-limiting locking bracket 1402 in accordance with various embodiments described herein. FIG. 14A depicts a 3D view of the locking bracket 1402. FIG. 14B depicts a side view of the locking bracket 1402. FIG. 14C depicts a front surface of the locking bracket 1402. Repetitive description of like elements employed in other embodiments described herein is omitted for the sake of brevity. In various embodiments, locking brackets 1402 can be comprised of a metal, though other suitable materials can be utilized (e.g., PVC, plastics, polymers, composites, a combination thereof, or other suitable plastics). In various implementations, a locking bracket 1402 can be mounted at one or more ends of a fastening track 108 to facilitate a mechanical lock of the fastening track 108 to a wall stud 1306 or another suitable structure.

In various embodiments, the locking bracket 1402 can comprise one or more mounting holes 1404 (e.g., on a stud portion 1408 of the locking bracket 1402) that can be secured to a wall stud with one or more fasteners. For instance, one or more fasteners (e.g., wood screws, nails, staples, and/or the like) can pass through the mounting holes 1404 and engage with a wall stud. Additionally, the locking bracket 1402 can comprise a tab 1406. The tab 1406 can be configured to engage with a slot 208 of the fastening track 108. In various implementations, the locking bracket 1402 can be installed after a tile panel 102 has been initially installed in order to inhibit removal of the tile panel 102. In some embodiments, the locking bracket 1402 can be utilized in a ceiling installation of a tile panel 102.

Figure 15:
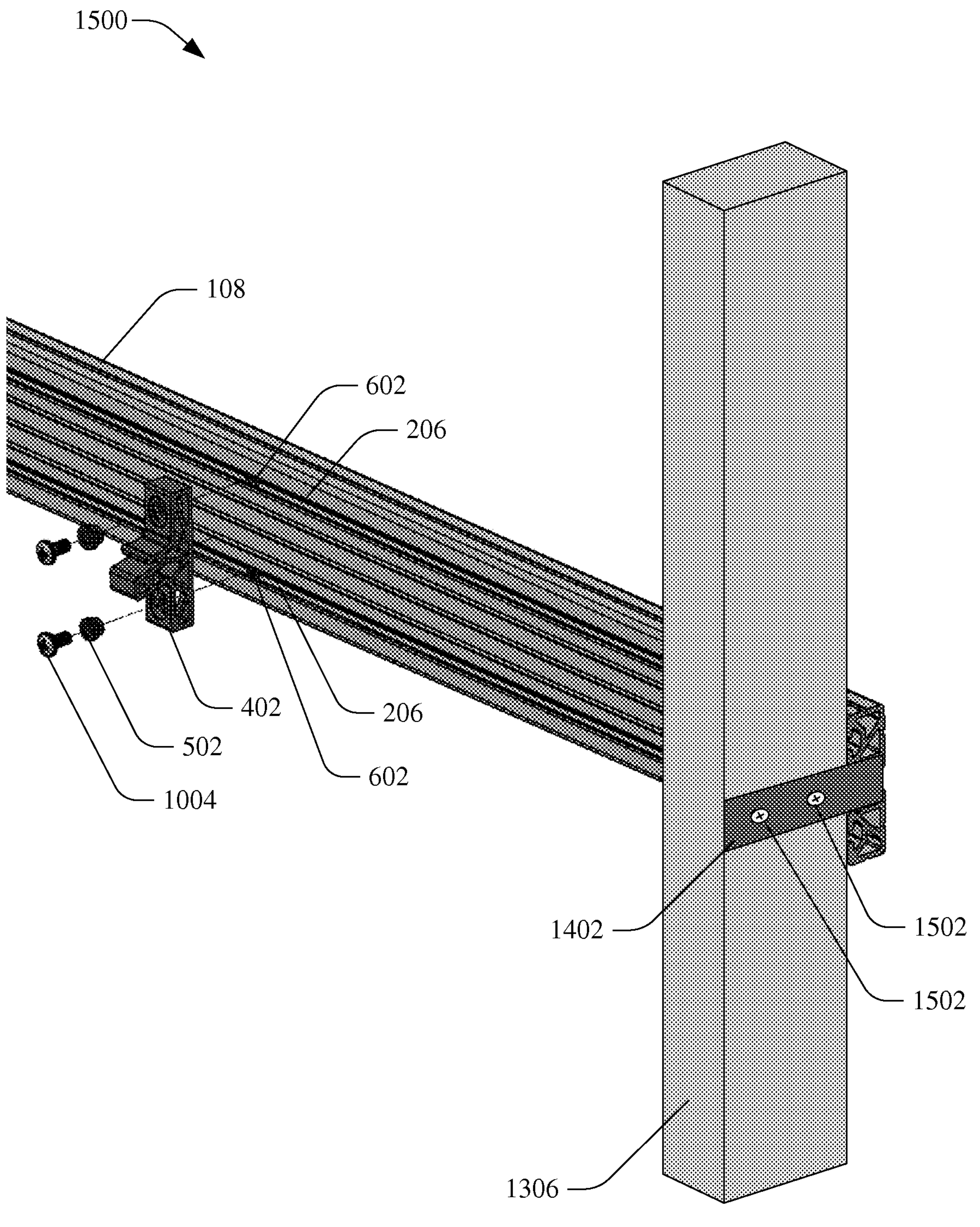
FIG. 15 illustrates a diagram of an example, non-limiting partial assembly of a tile panel mounting system in accordance with one or more embodiments described herein.

FIG. 15 illustrates a diagram of an example, non-limiting exploded view of an assembly 1500 comprising the receiving body 702 and two clips 402, and further comprising the fastening track 108 in accordance with one or more embodiments described herein. Repetitive description of like elements employed in other embodiments described herein is omitted for the sake of brevity. As shown in FIG. 15, the fastening track 108 can abut the wall stud 1306. Once the fastening track has been secured (e.g., via the clip 402), the fastening track can be locked in place by attaching the locking bracket 1402 to the fastening track 108, and securing the locking bracket 1402 the wall stud 1306 with one or more fasteners 1502 (e.g., screws, nails, staples, and/or the like).

Figure 16:
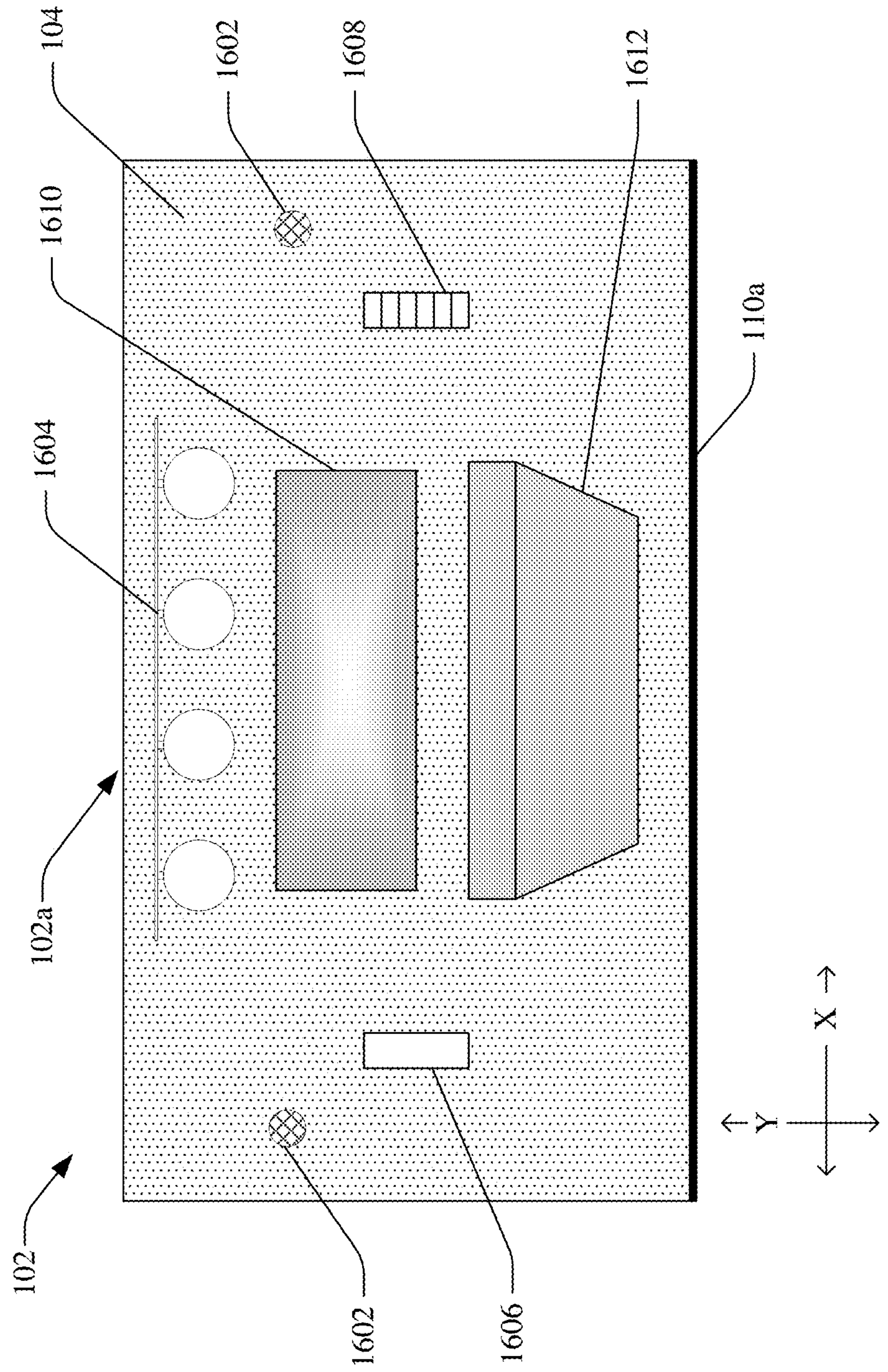
FIG. 16 illustrates a diagram of an example, non-limiting tile panel that can be mechanically mounted to a support structure in accordance with one or more embodiments described herein.

FIG. 16 illustrates a diagram of an example, non-limiting tile panel that can be mechanically mounted to a support structure in accordance with one or more embodiments described herein. In FIG. 16, the tile panel 102 is depicted with one or more accessories that can be incorporated on/into the tile panel 102 (e.g., on a front side 102*a* of the tile panel 102, or on another suitable surface of the tile panel 102). Such accessories can comprise one or more of speaker 1602, light 1604, touch panel 1606, switch 1608, mirror 1610, seat 1612, and/or other suitable accessories.

Speaker 1602 can comprise a speaker integrated or attached into/onto the tile panel 102. The speaker 1602 can, for instance, play music (e.g., via a Bluetooth connection) from a communicatively coupled device (e.g., a smartphone, tablet, computer, wearable device, or another suitable device). In some embodiments, the speaker 1602 can comprise a microphone. The microphone can be utilized to capture voice of a user. In this regard, the speaker 1602 can be utilized for audio communication (e.g., a telephone call), for instance, via a Bluetooth connection to a communicatively coupled device). In various embodiments, the tile panel 102 can comprise a plurality of the speaker 1602.

Light 1604 can comprise a light integrated or attached into/onto the tile panel 102. In various embodiments, the light 1604 can be adjustable between various light intensities, colors, and/or hues. The light 1604 can comprise a light bar, an individual light (e.g., LED or bulb), light strip, or another suitable light. In some embodiments, the light 1604 can comprise an integrated switch that can operate the light (e.g., adjust between various light intensities, colors, and/or hues). In various embodiments, the tile panel 102 can comprise a plurality of the light 1604.

Touch panel 1606 can comprise a touch panel integrated or attached into/onto the tile panel 102. In various embodiments, the touch panel 1606 can be utilized to control one or more other accessories of the tile panel 102 (e.g., speaker 1602, light 1604, switch 1608, mirror 1610, seat 1612, or another suitable accessory). The touch panel 1606 can comprise one or more of a variety of types of touch panels, such as a resistive touch panel, capacitive touch panel, optical imaging touch panel, infrared touch panel, acoustic wave touch panel, or another suitable type of touch panel. In various embodiments, the touch panel 1606 can be backlit and/or comprise a display screen. In various implementations, the tile panel 102 can comprise a plurality of the touch panel 1606.

Switch 1608 can comprise a switch integrated or attached into/onto the tile panel 102. In various embodiments, the switch 1608 can be utilized to control one or more other accessories of the tile panel 102 (e.g., speaker 1602, light 1604, touch panel 1606, mirror 1610, seat 1612, or another suitable accessory). In various embodiments, the switch 1608 can be backlit. In various implementations, the tile panel 102 can comprise a plurality of the switch 1608.

Mirror 1610 can comprise a mirror integrated or attached into/onto the tile panel 102. In various embodiments, the mirror 1610 can comprise a heated and/or illuminated mirror (e.g., controllable via the touch panel 1606 and/or switch 1608). In various implementations, the tile panel 102 can comprise a plurality of the mirror 1610.

Seat 1612 can comprise a seat integrated or attached into/onto the tile panel 102. In various embodiments, the seat can be adjustable (e.g., manually adjustable or power adjustable). For a power adjustable seat 1612, the seat 1612 can be adjustably controllable via the touch panel 1606 and/or switch 1608. In various embodiments, the tile panel 102 can comprise a plurality of the seat 1612. In some embodiments, the seat 1612 can be integrated with (e.g., molded) the tile panel 102. In other embodiments, the seat 1612 can be attached (e.g., removably attached) to the tile panel 102. To facilitate removable attachment of the seat 1612 to the tile panel 102, the seat 1612 and/or tile panel 102 can utilize components similar to those utilized to secure the tile panel 102 to a wall or set of wall studs. In this regard, the seat 1612 and/or tile panel 102 can further comprise one or more of a fastening track 108, clip 402, receiving body 702, and/or other components to secure the seat 1612 to the tile panel 102. In various implementations, the seat 1612 can comprise a mitered finish with a drop down return to integrate with the tile panel 102. In one or more embodiments, the seat 1612 and/or tile panel 102 can comprise integrated or attached grab bars or grab handles. In various embodiments, the tile panel 102 can comprise a plurality of the seat 1612.

Figure 17B:
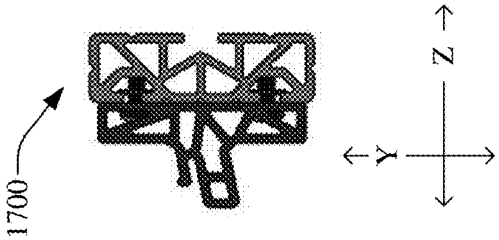
FIGS. 17A-17C illustrate a diagrams of an example, non-limiting horizontal placement jig in accordance with one or more embodiments described herein.
Figure 17A:
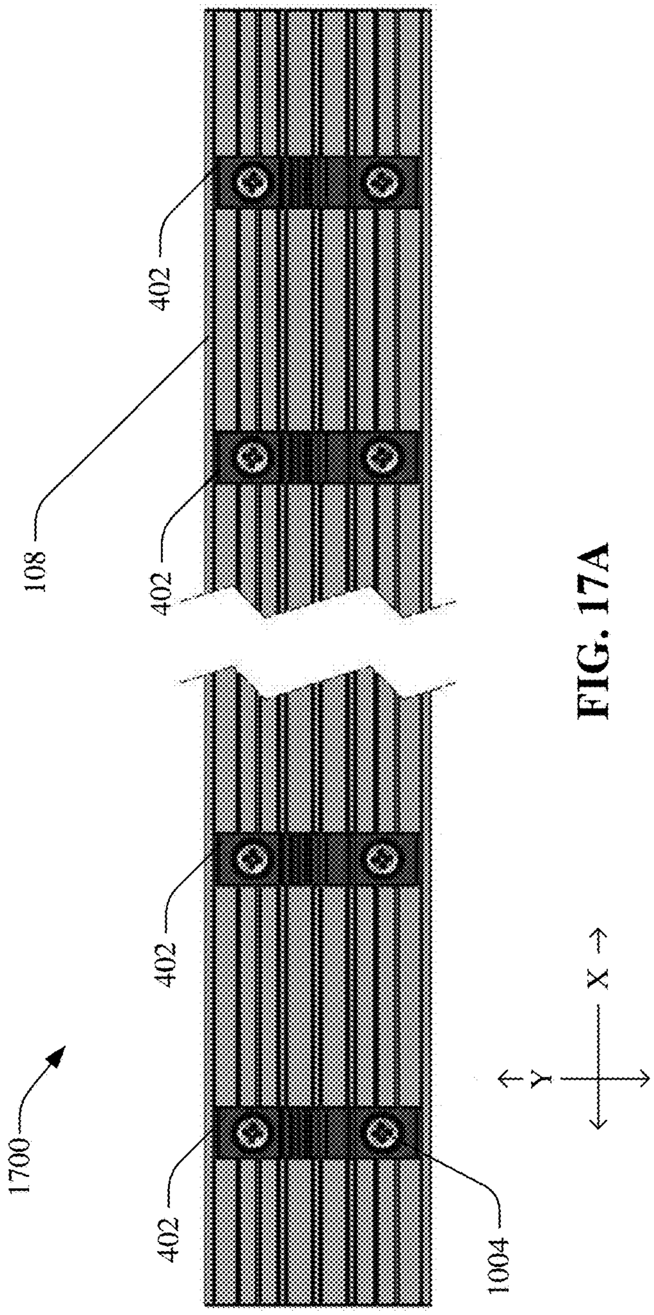
Figure 17C:
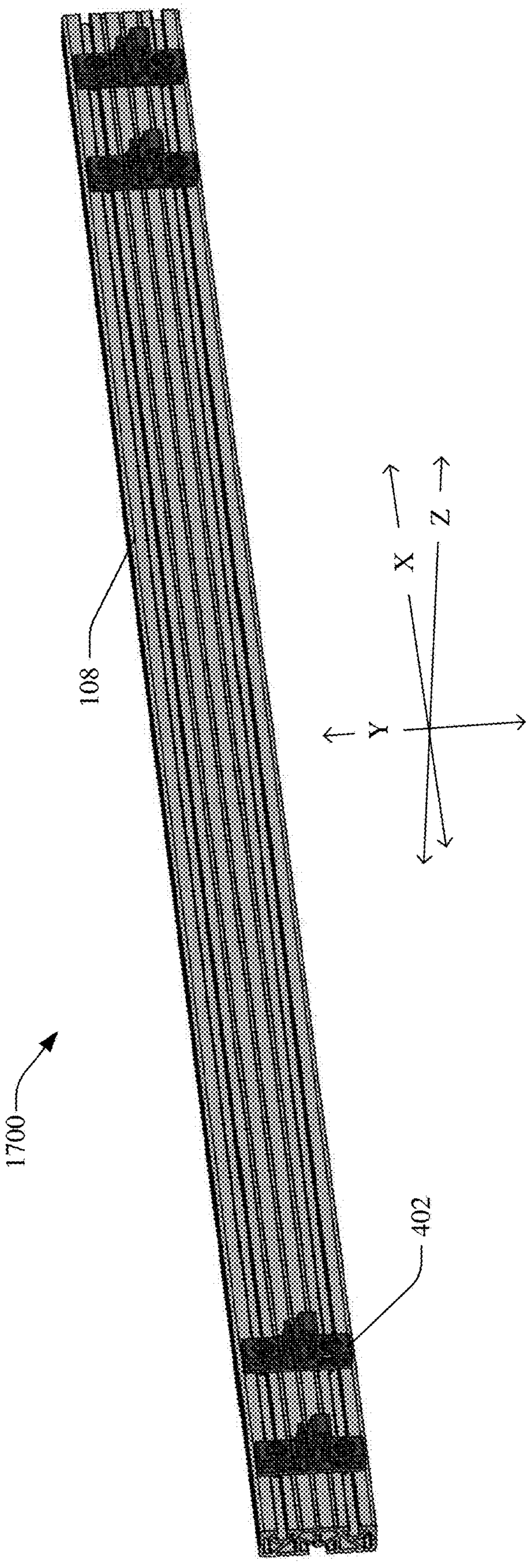
Figure 18A:
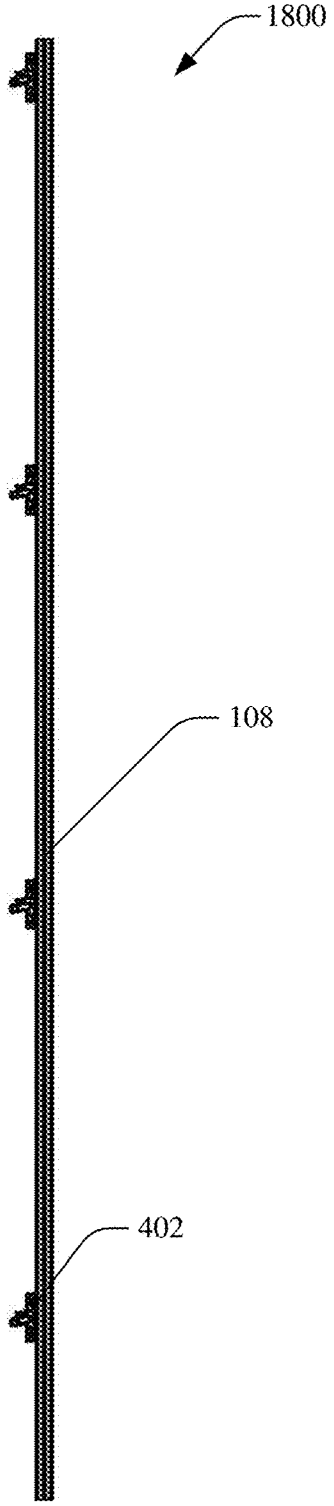
FIGS. 18A-18B illustrate a diagrams of an example, non-limiting vertical placement jig in accordance with one or more embodiments described herein.
Figure 18B:
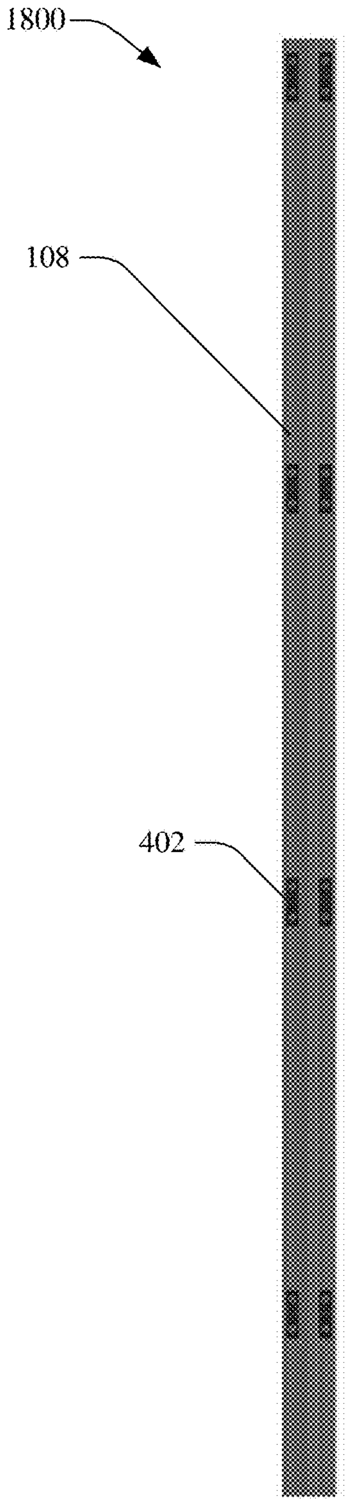

FIGS. 17A-17C illustrate a diagrams of an example, non-limiting horizontal placement jig 1700 in accordance with one or more embodiments described herein. The horizontal placement jig 1700 can comprise a free fastening track 108 with clips 402 fixed to positions along the lateral direction that correspond to the position of clips 402 fixed to the tile panel 102 to be mounted. FIGS. 18A-18B illustrate a diagrams of an example, non-limiting vertical placement jig 1800 in accordance with one or more embodiments described herein. The vertical placement jig 1800 can comprise a free fastening track 108 (e.g., not adhered to a tile panel 102) with clips 402 fixed at distances that correspond to the height of fastening tracks 108 on the tile panel 102 that is to be mounted to the receiving bodies 702.

The following manufacturing technique can be employed to create a vertical placement jig 1800 in reference to the tile panel 102 shown in FIGS. 1A-1E, which comprises three fastening tracks 108 and is to be mounted in the horizontal orientation. A free fastening track 108 can be oriented vertically (e.g., along the Y axis) adjacent to the tile panel 102 such that the bottom of the fastening track 108 is even with the bottom of the tile panel 102. One or more first clips 402 can be fixed to the free fastening track 108 at height (e.g., a point along the Y axis) such that the holes 412 of the one or more first clips 402 align with the channels 206 of the first fastening track 108*a*. One or more second clips 402 can be fixed to the free fastening track 108 at height (e.g., a point along the Y axis) such that the holes 412 of the one or more second clips 402 align with the channels 206 of the second fastening track 108*b*. Further, one or more third clips 402 can be fixed to the free fastening track 108 at height (e.g., a point along the Y axis) such that the holes 412 of the one or more third clips 402 align with the channels 206 of the third fastening track 108*c*. In various implementations, the vertical placement jig 1800 can comprise a level therein (e.g., a bubble level and/or a digital level) to ensure that the vertical placement jig 1800 is level.

In various embodiments, receiving bodies 702 can be interlocked onto the clips 402 of the vertical placement jig 1800. Subsequently, the vertical placement jig 1800 can be positioned within a stud bay. As a result, the interlocked receiving bodies 702 can be positioned at the proper heights within the stud bay to align with the to-be-mounted tile panel 102. While positioned at the proper heights, the receiving bodies 702 can be screwed (e.g., or nailed, stapled, and/or the like) into the studs of the stud bay (e.g., via the fastening holes 806 of the mounting brackets 802). In this regard, a column of receiving bodies 702 aligned with the mounting position of a first tile panel 102 can be established. Further, rows of additional receiving bodies 702 can be positioned using the horizontal placement jig 1700 with reference to the initial column of receiving bodies 702. For example, receiving bodies 702 can be interlocked onto clips 402 of the horizontal placement jig 1700. An end clip 402 of the horizontal placement jig 1700 can remain exposed to interlock with a receiving body 702 of the initial column. The exposed end clip 402 can be interlocked with the receiving body 702 of the column positioned at the target row height. Subsequently, the horizontal placement jig 1700 can be made level, thereby raising the attached receiving bodies 702 to the target height within respective stud bays, whereupon the receiving bodies 702 can be screwed (e.g., or nailed, stapled, and/or the like) into the studs of the stud bay (e.g., via the fastening holes 806 of the mounting brackets 802). Once the receiving bodies 702 are secured to the support structure (e.g., the wall studs), the horizontal placement jig 1700 and the vertical placement jig 1800 can be removed (e.g., forcibly removed) (e.g., pried off) the receiving bodies 702 to enable acceptance of the tile panels 102. In various implementations, the horizontal placement jig 1700 can comprise a level therein (e.g., a bubble level and/or a digital level) to ensure that the horizontal placement jig 1700 is level.

In another exemplary embodiment, the following technique can be utilized to manufacture a vertical placement jig 1800 using a free fastening track 108:

- measure a defined length (e.g., 9 inches up) (e.g., corresponding to the distance of a fastening track 108 of the tile panel 102 from an edge of the tile panel 102) from the desired height of the bottom edge of the tile panel 102 once mounted (e.g., leaving a 1/16 inch gap or another suitable gap between the shower pan 1308 and the mounted tile panel 102),
- create a level line across the studs corresponding to the defined length (e.g., the 9 inch mark or at a different suitable defined length),
- measure the distance between the shower pan 1308 and the level line at the far left of the wall and the far right of the wall (e.g., the receiving bodies 702 can be installed at the side with the lowest distance first),
- attach two first fixed clips 402 to the free fastening track 108 such that the bottom of the first fixed clips 402 is 9 and 9/16 inches (e.g., accounting for the gap between the shower pan and the mounted tile panel 102 along with the height of the bottom most fastening track 108 on the tile panel 102) up from the bottom edge of the free fastening track 108,
- attach two second fixed clips 402 to the free fastening track 108 such that the bottom of the second fixed clips 402 is 22 and 1/4 inches (or another suitable distance) up from the top of the first fixed clips 402 (e.g., based on the distance between fastening tracks 108 on the tile panel 102).

Figure 19:
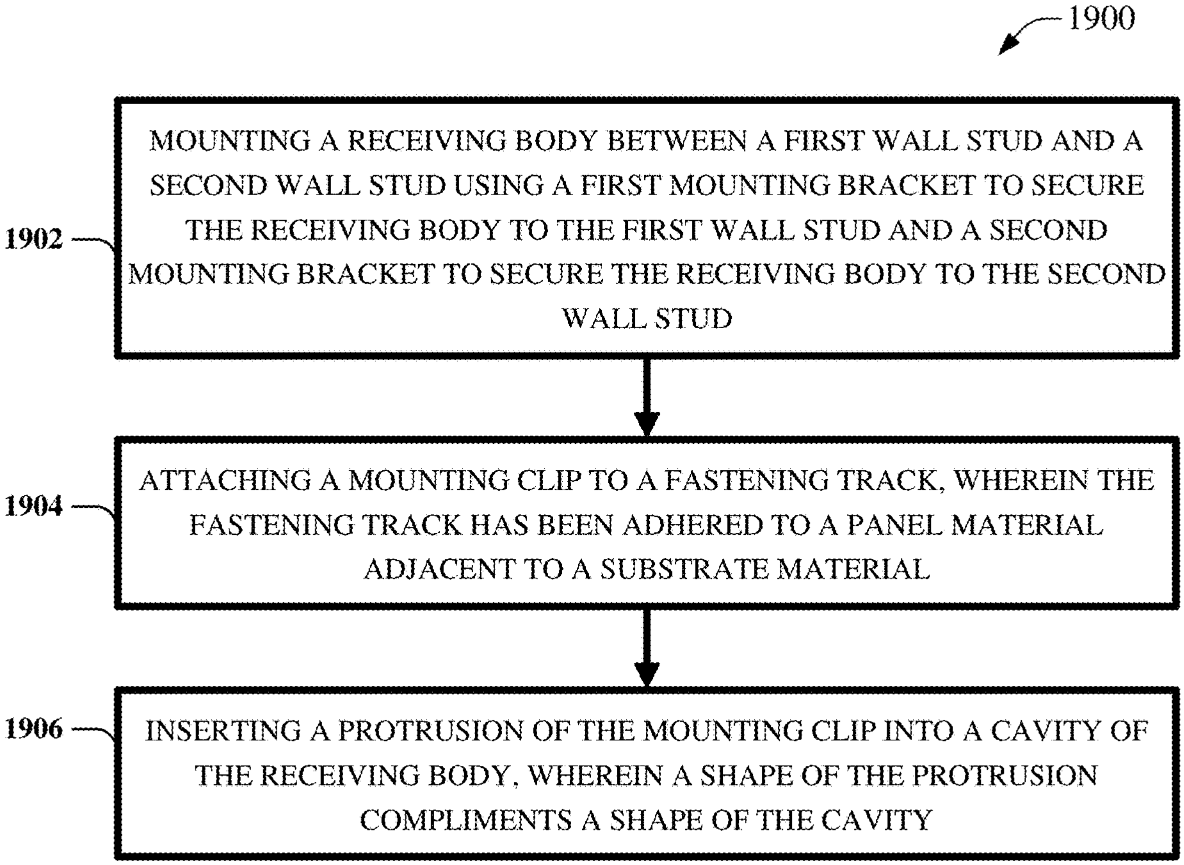
FIG. 19 illustrates a flow diagram of an example, non-limiting method for installing a panel mounting apparatus in accordance with one or more embodiments described herein.

FIG. 19 illustrates a flow diagram of an example, non-limiting method 1900 for installing a panel mounting apparatus in accordance with one or more embodiments described herein. In various embodiments, one or more of the features of method 1900 can be practiced in an alternative order than the sequence shown in FIG. 19. At 1902, the method 1900 can comprise mounting a receiving body (e.g., receiving body 702) between a first wall stud (e.g., a first instance of wall stud 1306) and a second wall stud (e.g., a second instance of wall stud 1306) using a first mounting bracket (e.g., a first instance of mounting bracket 802) to secure the receiving body (e.g., receiving body 702) to the first wall stud and a second mounting bracket (e.g., a second instance of the mounting bracket 802) to secure the receiving body (e.g., receiving body 702) to the second wall stud. At 1904, the method 1900 can comprise attaching a mounting clip (e.g., clip 402) to a fastening track (e.g., fastening track 108), wherein the fastening track (e.g., fastening track 108) has been adhered to a panel material (e.g., tile material 104) adjacent to a substrate material (e.g., rigid substrate 106). At 1906, the method 1900 can comprise inserting a protrusion (e.g., of the lock projection 410) of the mounting clip (e.g., clip 402) into a cavity of the receiving body (e.g., receiving body 702), wherein a shape of the protrusion compliments a shape of the cavity.

Figure 20:
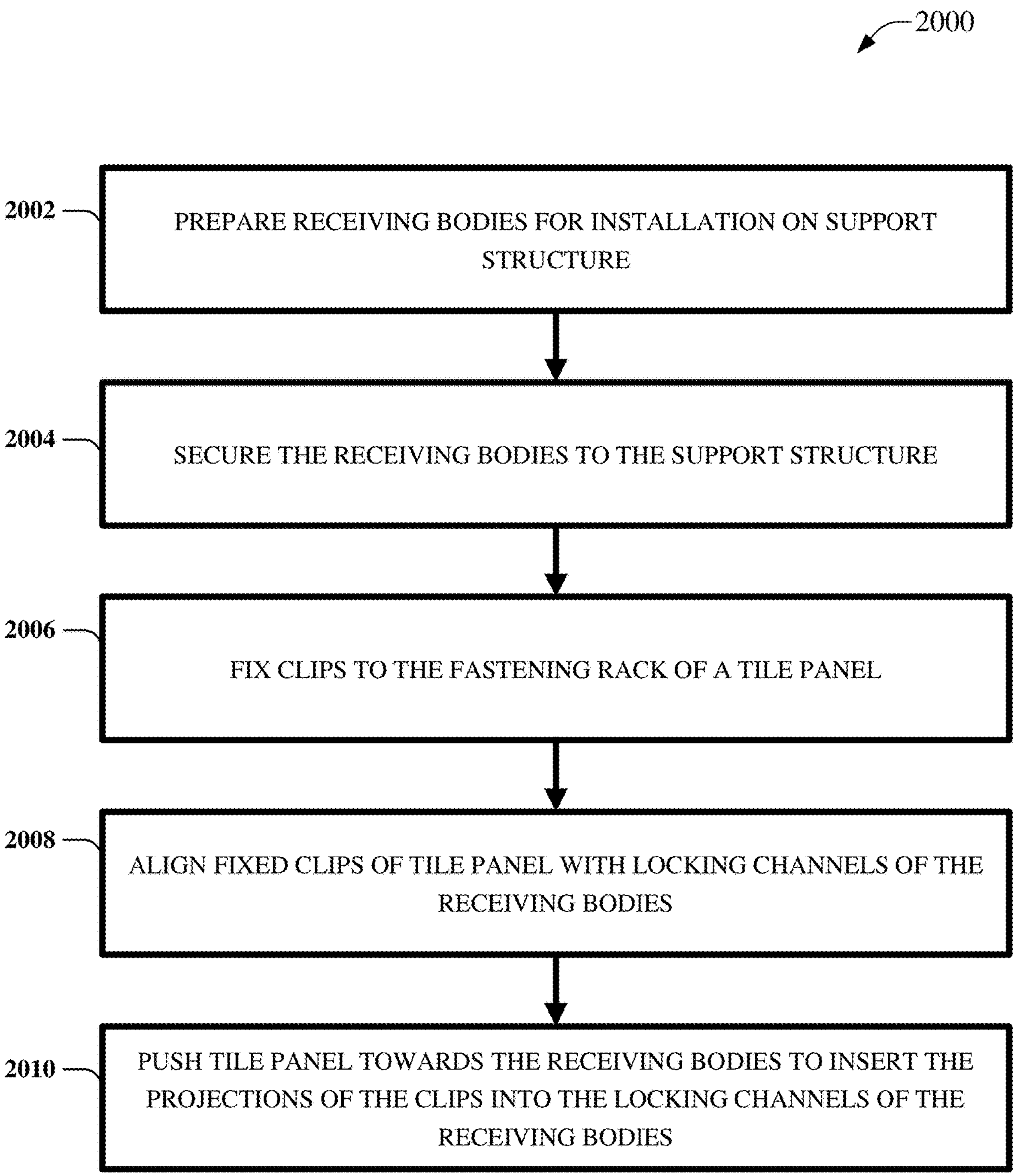
FIG. 20 illustrates a flow diagram of an example, non-limiting method for installing one or more tile panels onto a support structure in accordance with one or more embodiments described herein.

FIG. 20 illustrates a flow diagram of an example, non-limiting method 2000 for mounting one or more tile panels 102 to one or more support structures in accordance with one or more embodiments described herein. Repetitive description of like elements employed in other embodiments described herein is omitted for the sake of brevity. In various embodiments, one or more of the features of method 2000 can be practiced in an alternative order than the sequence shown in FIG. 20.

At 2002, the method 2000 can comprise preparing the one or more receiving bodies 702 for installation on the support structure. For example, where the support structure is the studs of a wall (e.g., shower wall 1302), an initial receiving body 702 can be cut to shorten the length of the receiving body 702 and create one or more receiving bodies 702 that can fit between adjacent studs (e.g., wall stud 1306) of the wall (e.g., accommodating for the thickness of the mounting brackets 802). For instance, a receiving body 702 can be cut to a length equal to the width of a stud bay (e.g., stud bay 1304) minus the combined thickness (e.g., along the X axis shown in FIG. 7A, FIG. 8B, and FIG. 11) of two mounting brackets 802. Further, the two mounting brackets 802 can be fixed to the resulting receiving body 702 (e.g., sized to fit the stud bay 1304) as exemplified in FIGS. 13A-13C.

In various embodiments, waterproofing materials (e.g., a seal member 110 or another suitable waterproofing material or sealant) can be installed on a support structure (e.g., bottom plate 1310, top plate 1312, and/or wall studs 1306). For example, waterproofing materials can be installed on the support structure prior to mounting the receiving bodies 702. For instance, where the tile panels 102 are to be mounted to shower walls, a waterproof skirting can be installed where the wall studs 1306 meet the shower pan (e.g., shower pan 1308). The waterproof skirting can extend over a portion of the shower pan and up a portion of the studs. Further the waterproof skirting can be sealed using caulking and/or flashing tape.

At 2004, the method 2000 can comprise securing the receiving bodies 702 to the support structure (e.g., bottom plate 1310, top plate 1312, and/or wall studs 1306). For example, the sized receiving bodies 702 can be positioned within the stud bays 1304 and screwed (e.g., or nailed, stapled, and/or the like) into the sides of the adjacent wall studs 1306 (e.g., through the fastening holes 806 of the mounting brackets 802). The sized receiving bodies 702 can be positioned within the stud bays 1304 so as to align with the fastening tracks 108 of the tile panels 102 when the tile panels 102 are mounted to the studs. To facilitate proper positioning of the receiving bodies 702 within the stud bays, a vertical placement jig 1800 and/or a horizontal placement jig 1700 can be employed.

At 2006, the method 2000 can comprise fixing clips 402 to the fastening tracks 108 of the tile panels 102 to be mounted. For example, one or more fasteners (e.g., nuts and/or bolts) can be employed to fix the clips 402 via the holes 412 on the clips 402 and the channels 206 on the fastening tracks 108 (e.g., as exemplified in FIG. 6, FIG. 9, and/or FIG. 11). At 2008, the method 2000 can comprise aligning the fixed clips 402 of the tile panel 102 with the locking channels 706 of the receiving bodies 702 secured to the support structure (e.g., secured to the wall studs). For example, the tile panel 102 can be lifted and aligned with the receiving bodies 702 such that the main projection 408 of the clips 402 on the tile panel 102 are inserted into the locking channels 706 of the receiving bodies 702. In various embodiments, at 2008, the clips 402 can be aligned with the receiving bodies 702, starting with the bottom most clips 402 on the tile panel 102 and proceeding sequentially to the upper most clips 402 (e.g., in order of height). At 2010, the method 2000 can comprise pushing the tile panel toward the receiving bodies 702 to further insert the projections (e.g., main projections 408 and/or lock projections 410) of the clips 402 into the locking channels 706 of the receiving bodies 702. For example, the tile panels 102 can be pushed toward the receiving bodies 702 until the protrusions on the lock projections 410 sit within the corresponding grooves within the locking channels 706 of the receiving bodies 702.

The features described above can be repeated multiple times with respective tile panels 102 to mount multiple tile panels 102 across the surface area of the support structure (e.g., the surface area of the shower wall 1302). Prior to mounting a tile panel 102 adjacent to an already-mounted tile panel 102, one or more seam skirts can be fixed to the support structure (e.g., wall studs), and/or the back side **102*b* of the tile panels 102, around the perimeter of the mounted tile panel 102. The one or more seam skirts can serve as a waterproofing material to inhibit the migration of water between mounted tile panels 102. For example, the one or more seam skirts can be mounted onto the support structure (e.g., wall studs) such that the seam skirts extend (e.g., for about 4 inches) under the perimeter edges of the tile panels 102 when mounted. Further the one or more seam skirts can be fixed using caulking and/or flashing tape (e.g., a caulk seam can be established between the seam skirt and adjacent tile panels 102). Where tile panels 102 are positioned adjacent to each other, spacers and/or levels can be employed to established aligned gaps between tile panels and/or level the exposed surface of the tile panels 102 with each other. Additionally, grout and/or caulk can be deposited into the gaps between mounted tile panels 102 (e.g., supported at least partially by the one or more seam skirts). Additionally, where the tile panels 102 are mounted to multiple walls (e.g., three adjacent walls forming a shower stall), the tile panels 102** can be mounted to the back wall (e.g., the wall between adjacent walls) first and then the side walls.

Figure 21:
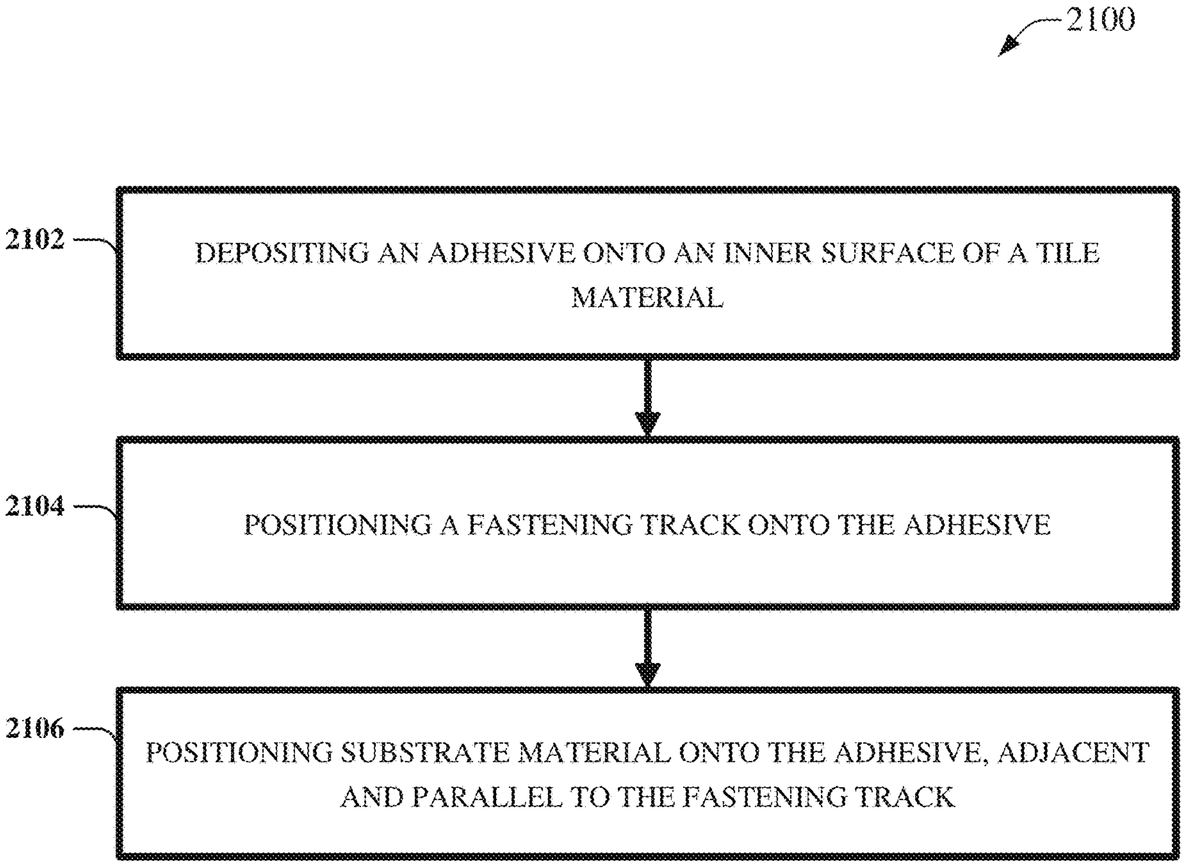
FIG. 21 illustrates a flow diagram of an example, non-limiting method for manufacturing a tile panel that can be mounted to a support structure via mechanical means in accordance with one or more embodiments described herein.

FIG. 21 illustrates a flow diagram of an example, non-limiting method 2100 for manufacturing a tile panel (e.g., tile panel 102) that can be mounted to a support structure (e.g., bottom plate 1310, top plate 1312, and/or wall studs 1306) via mechanical means in accordance with one or more embodiments described herein. In various embodiments, one or more of the features of method 2100 can be practiced in an alternative order than the sequence shown in FIG. 21. At 2102, the method 2100 can comprise depositing an adhesive (e.g., adhesive layer 1202) onto an inner surface (e.g., back side **102*b*) of a tile material (e.g., tile material 104). At 2104, the method 2100 can comprise positioning a fastening track (e.g., fastening track 108) onto the adhesive (e.g., adhesive layer 1202). At 2106, the method 2100 can comprise positioning substrate material (e.g., rigid substrate 106) onto the adhesive (e.g., adhesive layer 1202), adjacent and parallel to the fastening track (e.g., fastening track 108**).

Figure 22:
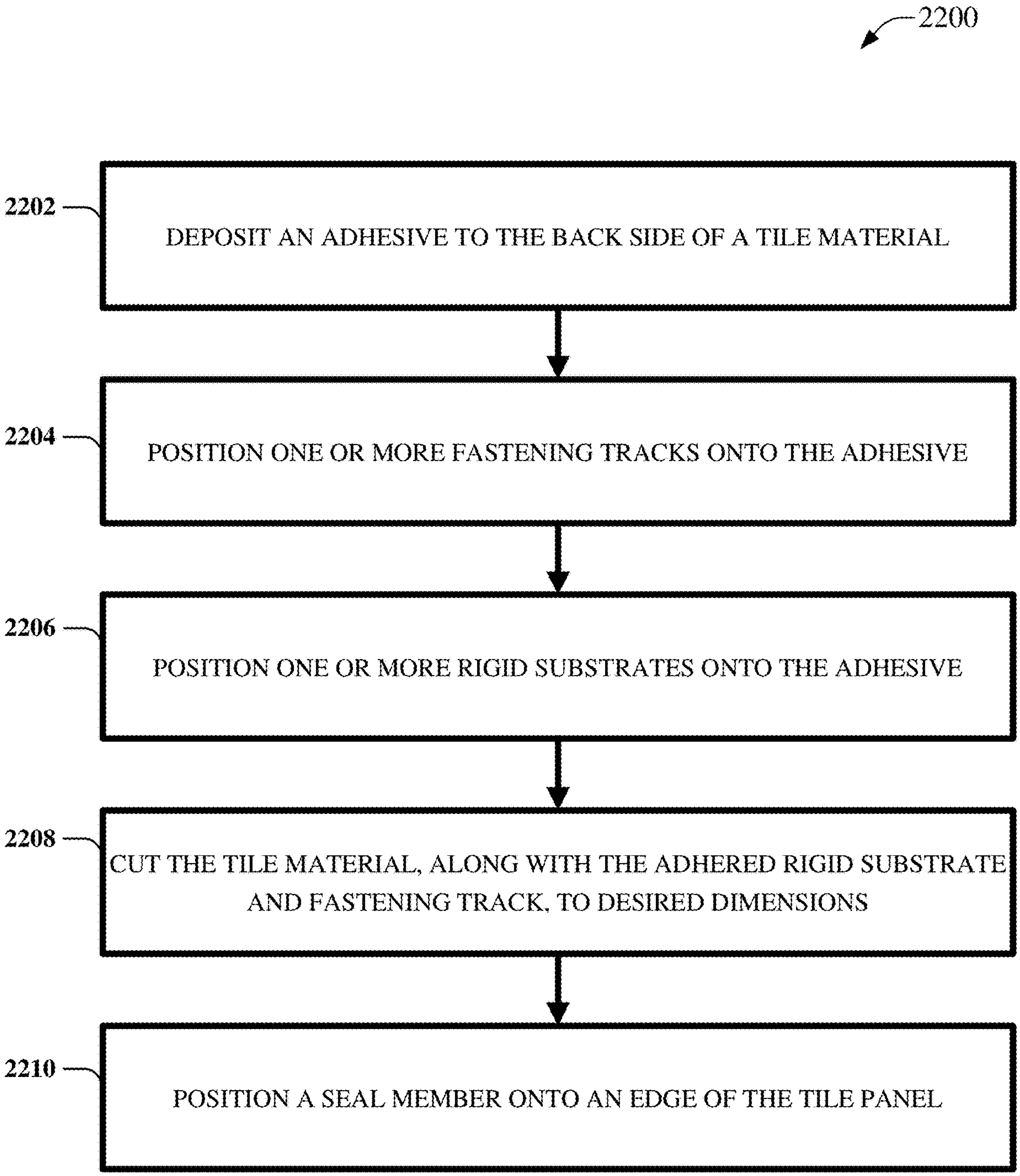
FIG. 22 illustrates a flow diagram of an example, non-limiting method for manufacturing a tile panel that can be mounted to a support structure via mechanical means in accordance with one or more embodiments described herein.

FIG. 22 illustrates a flow diagram of an example, non-limiting method 2200 for manufacturing a tile panel 102 in accordance with one or more embodiments described herein. Repetitive description of like elements employed in other embodiments described herein is omitted for the sake of brevity. In various embodiments, one or more of the features of method 2200 can be practiced in an alternative order than the sequence shown in FIG. 22.

At 2202, the method 2200 can comprise depositing an adhesive (e.g., adhesive layer 1202) to the back side (e.g., back side **102*b*) of a tile material 104. For example, the adhesive can comprise a marine grade adhesive. In various embodiments, the adhesive can be rolled, sprayed, and/or poured onto the tile material 104. At 2204, the method 2200 can comprise positioning one or more fastening tracks 108 onto the adhesive. The number of fastening tracks 108 and/or orientation of the fastening tracks 108 can vary depending on the size, shape, and/or weight of the tile material 104. In various embodiments, the plurality of fastening tracks 108 can be positioned on the adhesive (e.g., adhesive layer 1202). In various embodiments, the fastening tracks 108 can be spaced apart from each other by a defined distance. At 2206, the method 2200 can comprise positioning one or more rigid substrates 106 onto the adhesive (e.g., adhesive layer 1202). For example, the one or more rigid substrates 106 can be positioned between the fastening tracks 108. At 2208, the method 2200 can comprise cutting the tile material 104, along with the adhered rigid substrate 106 and/or one or more fastening tracks 108, to one or more defined and/or desired dimensions. As described herein, the rigid substrate 106 and/or fastening tracks 108 can improve the durability of the tile material 104 and can thus reduce the likelihood of damaging the tile material 104 when cutting the tile material 104 to size. At 2210, the one or more seal members (e.g., seal member 110) can be positioned onto an edge of the formed tile panel 102. For example, the seal member 110 can comprise one or more of a variety of materials or strips of elastic material (e.g., neoprene, rubber, silicone, nitrile, ethylene propylene diene terpolymer, fluoropolymer elastomer and/or synthetic rubber compounds, styrene butadiene, butadiene acrylonitrile, ethylene propylene, butyl, chlorosulfonated polyethylene, plastic, polymer, composite, or another suitable material and/or combination thereof that can be utilized to form a waterproof or water resistant seal). In various embodiments, the tile panel 102 can be installed in an environment that can experience water (e.g., a shower), in which the seal member 110 can be utilized to facilitate a waterproof seal adjacent to an edge of the tile panel 102 (e.g., a waterproof seal between the bottom of a tile panel 102** and lower surface, such as a floor).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is, of course, not possible to describe every conceivable combination of components, products and/or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices, and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A panel mounting apparatus, comprising:
- a panel material comprising a first side and a second side opposite the first side of the panel material;
- a substrate material attached to the second side of the panel material;
- a fastening track attached to the second side of the panel material, adjacent to the substrate material, wherein the fastening track comprises at least one channel;
- a mounting clip attached to the fastening track on a first side of the mounting clip, wherein the mounting clip comprises a projection from a second side of the mounting clip opposite the first side of the mounting clip, wherein the mounting clip comprises at least one opening, and wherein the first side of the mounting clip mounts flush against a surface of the fastening track;
- a receiving body comprising a locking channel that receives the projection, wherein an internal shape of the locking channel compliments an external shape of the projection; and
- a fastener inserted through the at least one opening of the mounting clip into the at least one channel of the fastening track.

2. The panel mounting apparatus of claim 1, further comprising:
- a first mounting bracket and a second mounting bracket attached to opposite ends of the receiving body, wherein the first mounting bracket and the second mounting bracket are configured to secure the receiving body within a space between two adjacent wall studs, and wherein the receiving body is recessed relative to a front surface of the two adjacent wall studs.

3. The panel mounting apparatus of claim 2, further comprising:
- a locking bracket that locks the fastening track to the wall stud.

4. The panel mounting apparatus of claim 1, wherein the substrate material is attached to the second side of the panel material with a marine grade adhesive sealant, and wherein the fastening track is attached to the second side of the panel material with the marine grade adhesive sealant.

5. The panel mounting apparatus of claim 1, wherein the panel material comprises a tile or stone material.

6. The panel mounting apparatus of claim 1, wherein the substrate material comprises a waterproof polystyrene foam panel.

7. The panel mounting apparatus of claim 1, further comprising:
- a t-nut received in the at least one channel of the fastening track, wherein the fastener comprises a bolt inserted from the second side of the mounting clip toward the first side of the mounting clip, and wherein the mounting clip is attached to the fastening track via attachment of the bolt to the t-nut.

8. The panel mounting apparatus of claim 1, further comprising a waterproof membrane attached along a perimeter of the panel material.

9. The panel mounting apparatus of claim 1, further comprising:
- a shower pan received beneath the panel material.

10. The panel mounting apparatus of claim 1, wherein an exterior surface of the fastening track is substantially flush with an exterior surface of the substrate material.

11. The panel mounting apparatus of claim 1, wherein the internal shape of the locking channel and the external internal shape of the projection comprise a snap-fit engagement.

12. A bathroom assembly, comprising:
- a panel material comprising a first side and a second side opposite the first side of the panel material;
- a substrate material attached to the second side of the panel material;
- a fastening track attached to the second side of the panel material, adjacent to the substrate material wherein the fastening track comprises a channel;
- a mounting clip attached to the fastening track on a first side of the mounting clip, wherein the mounting clip comprises a projection from a second side of the mounting clip opposite the first side of the mounting clip, wherein the mounting clip comprises an opening, and wherein the first side of the mounting clip is flush with a surface of the fastening track;
- a receiving body comprising locking channel that receives the projection; and
- a fastener inserted through the opening of the mounting clip into the channel of the fastening track.

13. The bathroom assembly of claim 12, wherein the panel material comprises an integrated shower seat.

14. The bathroom assembly of claim 12, wherein the panel material comprises an integrated heated mirror.

15. The bathroom assembly of claim 12, wherein the panel material comprises an integrated light operable via an integrated switch.

16. The bathroom assembly of claim 12, further comprising:
- a first mounting bracket and a second mounting bracket attached to opposite ends of the receiving body, wherein the first mounting bracket and the second mounting bracket are configured to secure the receiving body within a space between two adjacent wall studs, and wherein the receiving body is recessed relative to a front surface of the two adjacent wall studs.

17. The bathroom assembly of claim 12, wherein an internal shape of the locking channel and an external internal shape of the projection comprise a snap-fit engagement.

18. An apparatus, comprising:
- a panel material comprising a first side and a second side opposite the first side of the panel material;
- a substrate material attached to the second side of the panel material;
- a fastening track attached to the second side of the panel material, adjacent to the substrate material, wherein the fastening track comprises at least one channel;
- a mounting clip attached to the fastening track on a first side of the mounting clip, wherein the mounting clip comprises a projection from a second side of the mounting clip opposite the first side of the mounting clip, wherein the mounting clip comprises at least one hole, and wherein the first side of the mounting clip mounts substantially flush against a surface of the fastening track; and
- a receiving body comprising locking channel that receives the projection;

a fastener inserted through the at least one hole of the mounting clip into the at least one channel of the fastening track.

19. The apparatus of claim 18, wherein an outer surface of the fastening track is substantially flush with an outer surface of the substrate material.

20. The apparatus of claim 18, wherein the panel material comprises stone material.

* * * * *